United States Patent
Degling-Wikingsson et al.

(10) Patent No.: US 12,502,403 B2
(45) Date of Patent: Dec. 23, 2025

(54) TAFOXIPARIN FOR THE TREATMENT OF PREECLAMPSIA

(71) Applicant: DILAFOR AB, Solna (SE)

(72) Inventors: Lena Degling-Wikingsson, Spanga (SE); Gunvor Ekman-Ordeberg, Danderyd (SE); Stefan Hansson, Lomma (SE)

(73) Assignee: DILAFOR AB, Solna (SE)

( * ) Notice: Subject to any disclaimer, the term of this patent is extended or adjusted under 35 U.S.C. 154(b) by 630 days.

(21) Appl. No.: 17/800,131

(22) PCT Filed: Feb. 16, 2021

(86) PCT No.: PCT/EP2021/053733
§ 371 (c)(1),
(2) Date: Aug. 16, 2022

(87) PCT Pub. No.: WO2021/165240
PCT Pub. Date: Aug. 26, 2021

(65) Prior Publication Data
US 2023/0144378 A1    May 11, 2023

(30) Foreign Application Priority Data
Feb. 17, 2020 (SE) .................................. 2000033-7

(51) Int. Cl.
A61K 31/727 (2006.01)
A61K 31/616 (2006.01)
A61K 45/06 (2006.01)
A61P 7/04 (2006.01)

(52) U.S. Cl.
CPC .......... *A61K 31/727* (2013.01); *A61K 31/616* (2013.01); *A61K 45/06* (2013.01); *A61P 7/04* (2018.01)

(58) Field of Classification Search
CPC .............. A61K 2300/00; A61K 31/616; A61K 31/727; A61K 45/06; A61P 15/04; A61P 7/04
See application file for complete search history.

(56) References Cited

U.S. PATENT DOCUMENTS

2015/0057226 A1* 2/2015 Ekman-Ordeberg ........................ A61K 31/727 514/11.6
2017/0027981 A1* 2/2017 Baker ................... C12Q 1/6876

FOREIGN PATENT DOCUMENTS

| EP | 1016410 A1 | 7/2000 |
| WO | 2003/055499 A1 | 7/2003 |
| WO | 2007/015841 A2 | 2/2007 |
| WO | 2013/095279 A1 | 6/2013 |
| WO | 2013/147689 A1 | 10/2013 |
| WO | 2013/147690 A1 | 10/2013 |
| WO | 2013/169194 A1 | 11/2013 |
| WO | 2014/202982 A1 | 12/2014 |
| WO | 2019/236453 A1 | 12/2019 |

OTHER PUBLICATIONS

Wat (Journal of Thrombosis and Haemostasis, 2018, 16:1510-1522).*
American Diabetes Association, Classification and Diagnosis of Diabetes. Diabetes Care. Jan. 2017;40(Suppl 1):S11-S24.
Awoyemi et al., Glycosylated Siglec-6 expression in syncytiotrophoblast-derived extracellular vesicles from preeclampsia placentas. Biochem Biophys Res Commun. Dec. 17, 2020;533(4):838-844.
Bellamy et al., Pre-eclampsia and risk of cardiovascular disease and cancer in later life: systematic review and meta-analysis. BMJ. Nov. 10, 2007;335(7627):974, 12 pages.
Biro et al., Various levels of circulating exosomal total-miRNA and miR-210 hypoxamiR in different forms of pregnancy hypertension. Pregnancy Hypertens. Oct. 2017;10:207-212.
Campello et al., Circulating microparticles in umbilical cord blood in normal pregnancy and pregnancy with preeclampsia. Thromb Res. Aug. 2015;136(2):427-31.
Chen et al., Pre-eclampsia and cardiovascular disease. Cardiovasc Res. Mar. 15, 2014;101(4):579-86.
Cooper, The effect of placental syncytiotrophoblast microvillous membranes from normal and pre-eclamptic women on the growth of endothelial cells in vitro. Br J Obstet Gynaecol. Jun. 1994;101(6):559.
Cronqvist et al., Placental syncytiotrophoblast extracellular vesicles enter primary endothelial cells through clathrin-mediated endocytosis. Placenta. Oct. 2020;100:133-141.
Cronqvist, Placental Vesicles and their miRNAs in Preeclampsia and Normal Pregnancies—Uptake and Function. Dissertation. Lund University. Department of Women's and Reproductive Health, University of Oxford, UK. 150 pages, Jan. 31, 2020.
Cronqvist et al., Syncytiotrophoblast derived extracellular vesicles transfer functional placental miRNAs to primary human endothelial cells. Sci Rep. Jul. 4, 2017;7(1):4558, 14 pages.
Edvinsson et al., Characterization of Relaxant Responses to Natriuretic Peptides in the Human Microcirculation in Vitro and in Vivo. Microcirculation. Aug. 2016;23(6):438-46.
Edvinsson et al., Differential localization and characterization of functional calcitonin gene-related peptide receptors in human subcutaneous arteries. Acta Physiol (Oxf). Apr. 2014;210(4):811-22.
Geelhoed et al., Preeclampsia and gestational hypertension are associated with childhood blood pressure independently of family adiposity measures: the Avon Longitudinal Study of Parents and Children. Circulation. Sep. 21, 2010;122(12):1192-9.
Gill et al., Placental Syncytiotrophoblast-Derived Extracellular Vesicles Carry Active NEP (Neprilysin) and Are Increased in Preeclampsia. Hypertension. May 2019;73(5):1112-1119.
Grell et al., Contractile Responses in Spontaneously Hypertensive Rats after Transient Middle Cerebral Artery Occlusion. Pharmacology. 2018;101(3-4):120-132.
Gris et al., Addition of enoxaparin to aspirin for the secondary prevention of placental vascular complications in women with severe pre-eclampsia. The pilot randomised controlled NOH-PE trial. Thromb Haemost. Dec. 2011;106(6):1053-61.

(Continued)

*Primary Examiner* — Pancham Bakshi
(74) *Attorney, Agent, or Firm* — McCarter & English, LLP; Steven G. Davis; James M. Alburger

(57) ABSTRACT

The present invention is directed to the use of the heparin derivative tafoxiparin in the treatment of preeclampsia (PE). The treatment may be monotherapy or combination therapy, where tafoxiparin is used in combination with an agent (drug) used as standard of care therapy in preeclampsia (PE).

20 Claims, 7 Drawing Sheets

(56) References Cited

OTHER PUBLICATIONS

Han et al., Placenta-derived extracellular vesicles induce preeclampsia in mouse models. Haematologica. Jun. 2020;105(6):1686-1694.

Hogestatt et al., Mechanical properties of rat cerebral arteries as studied by a sensitive device for recording of mechanical activity in isolated small blood vessels. Acta Physiol Scand. Jan. 1983;117(1):49-61.

Lindqvist et al., Beslut om trombosprofylax vid graviditet—enklare med riskpoang [Thrombosis prophylaxis decisions in pregnancy—simpler with risk scores]. Lakartidningen. May 3-9, 2006;103(18):1429-32.

Mclaughlin et al., Low Molecular Weight Heparin Improves Endothelial Function in Pregnant Women at High Risk of Preeclampsia. Hypertension. Jan. 2017;69(1):180-188.

Melchiorre et al., Preeclampsia is associated with persistent postpartum cardiovascular impairment. Hypertension. Oct. 2011;58(4):709-15.

Mello et al., Low-molecular-weight heparin lowers the recurrence rate of preeclampsia and restores the physiological vascular changes in angiotensin-converting enzyme DD women. Hypertension. Jan. 2005;45(1):86-91.

Motta-Mejia et al., Placental Vesicles Carry Active Endothelial Nitric Oxide Synthase and Their Activity is Reduced in Preeclampsia. Hypertension. Aug. 2017;70(2):372-381.

Ohlsson et al., Fremanezumab blocks CGRP induced dilatation in human cerebral, middle meningeal and abdominal arteries. The Journal of Headache and Pain. 2018;19:66, 6 pages.

Poon et al., The International Federation of Gynecology and Obstetrics (FIGO) initiative on pre-eclampsia: A pragmatic guide for first-trimester screening and prevention. Int J Gynaecol Obstet. May 2019;145 Suppl 1(Suppl 1):1-33.

Redman et al., Circulating microparticles in normal pregnancy and pre-eclampsia. Placenta. Mar. 2008;29 Suppl A:S73-7.

Rey et al., Dalteparin for the prevention of recurrence of placental-mediated complications of pregnancy in women without thrombophilia: a pilot randomized controlled trial. J Thromb Haemost. Jan. 2009;7(1):58-64.

Sammar et al., Reduced placental protein 13 (PP13) in placental derived syncytiotrophoblast extracellular vesicles in preeclampsia—A novel tool to study the impaired cargo transmission of the placenta to the maternal organs. Placenta. Jun. 2018;66:17-25.

Shen et al., Trophoblast debris extruded from preeclamptic placentae activates endothelial cells: a mechanism by which the placenta communicates with the maternal endothelium. Placenta. Oct. 2014;35(10):839-47.

Southcombe et al., The immunomodulatory role of syncytiotrophoblast microvesicles. PLoS One. 2011;6(5):e20245, 10 pages.

Steegers et al., Pre-eclampsia. Lancet. Aug. 21, 2010;376(9741):631-44.

Tannetta et al., Characterisation of syncytiotrophoblast vesicles in normal pregnancy and pre-eclampsia: expression of Flt-1 and endoglin. PLoS One. 2013;8(2):e56754, 13 pages.

Tannetta et al., Update of syncytiotrophoblast derived extracellular vesicles in normal pregnancy and preeclampsia. J Reprod Immunol. Feb. 2017;119:98-106.

Torricelli et al., Low-molecular-weight heparin improves the performance of uterine artery Doppler velocimetry to predict preeclampsia and small-for-gestational age infant in women with gestational hypertension. Ultrasound Med Biol. Sep. 2006;32(9):1431-5.

Wang et al., Endothelium-dependent relaxation of small resistance vessels is impaired in patients with autosomal dominant polycystic kidney disease. J Am Soc Nephrol. Aug. 2000;11(8):1371-1376.

Wat et al., Effects of glycol-split low molecular weight heparin on placental, endothelial, and anti-inflammatory pathways relevant to preeclampsia. Biol Reprod. Nov. 1, 2018;99(5):1082-1090.

Wat et al., Molecular actions of heparin and their implications in preventing pre-eclampsia. Journal of Thrombosis and Haemostasis. Aug. 2018; 16(8):1510-1522.

Wat et al., The antithrombin binding regions of heparin mediate fetal growth and reduced placental damage in the Rupp model of preeclampsia\. Biol Reprod. Apr. 24, 2020;102(5):1102-1110.

World Health Organization, About diabetes. Retrived online at: http://www.who.int/diabetes/action_online/basics/en/. WHO. 2 pages, Mar. 31, 2014.

World Health Organization, Diabetes. Retrieved online at: https://www.who.int/en/news-room/fact-sheets/detail/diabetes. WHO. 5 pages, (2021).

Xiao et al., Treating normal early gestation placentae with preeclamptic sera produces extracellular micro and nano vesicles that activate endothelial cells. J Reprod Immunol. Apr. 2017;120:34-41.

International Search Report and Written Opinion for Application No. PCT/EP2021/053733, dated May 17, 2021, 14 pages.

Lu, Aspirin or heparin or both in the treatment of recurrent spontaneous abortion in women with antiphospholipid antibody syndrome: a meta-analysis of randomized controlled trials. The Journal of Maternal-Fetal & Neonatal Medicine. Jan. 10, 2018;32(8):1299-1311.

\* cited by examiner

TAFOXIPARIN FOR THE TREATMENT OF PREECLAMPSIA

CROSS REFERENCE TO RELATED APPLICATIONS

This application is a U.S. National Stage Application filed under 35 U.S.C. § 371 (c), based on International Patent Application No. PCT/EP2021/053733, filed on Feb. 16, 2021, which claims the benefit of and priority to SE Application No. 2000033-7 filed Feb. 17, 2020, the contents of which is incorporated herein by reference.

FIELD OF THE INVENTION

The present invention is directed to the use of the heparin derivative tafoxiparin in the treatment of preeclampsia (PE). The treatment may be monotherapy or combination therapy, where tafoxiparin may be used in combination with an agent (drug) used as standard of care therapy in preeclampsia (PE).

BACKGROUND OF THE INVENTION

Preeclampsia is a pregnancy-specific vascular disease characterized by de novo maternal hypertension and organ damage. It annually affects at least 8.5 million women worldwide and is a leading cause of maternal and perinatal morbidity and mortality (Steegers, E. A., et al., *Pre-eclampsia. Lancet*, 2010. 376 (9741): pp. 631-644). Preeclampsia (PE) is often referred to as the emblematic representative of "ischemic placental diseases" or "placental vascular complications" and is a significant cause of maternal and perinatal morbidity and mortality. PE is twice as common in first time mothers as it is in women who have previously given birth. Maternal morbidity includes severe hypertension without or with seizures (eclampsia), cerebrovascular accidents, placental abruption, pulmonary edema, hepatic and kidney dysfunctions. Fetal risks include growth restriction in nearly 25% of cases, preterm birth and death either in utero or as a result of prematurity (nearly 2 per 100 cases) (Jean-Christophe Gris et al. *Addition of enoxaparin to aspirin for the secondary prevention of placental vascular complications in women with severe pre-eclampsia. Thrombosis and Haemostasis* 106.6/2011).

The acute manifestations of PE resolve after the delivery of the baby but leaves the women with permanent vascular damage (Melchiorre, K., et al., *Preeclampsia is associated with persistent postpartum cardiovascular impairment. Hypertension*, 2011. 58(4): pp. 709-715).

Preeclampsia is associated with increased risk for future chronic hypertension, cardiovascular disease (CVD), cerebrovascular disease, and death (Bellamy, L., et al., *Pre-eclampsia and risk of cardiovascular disease and cancer in later life: systematic review and meta-analysis. BMJ*, 2007. 335(7627): p. 974). The risk of dying from ischemic heart disease following preeclampsia has been estimated to 2.5-fold higher than that of women without preeclampsia (Bellamy, L., et al., *Pre-eclampsia and risk of cardiovascular disease and cancer in later life: systematic review and meta-analysis. BMJ*, 2007. 335(7627): p. 974). In addition, several epidemiological studies have suggested that the offspring of mothers with preeclampsia and gestational hypertension also have increased risk for long-term hypertension and CVD (Geelhoed, J. J., et al., *Preeclampsia and gestational hypertension are associated with childhood blood pressure independently of family adiposity measures: the Avon Longitudinal Study of Parents and Children. Circulation*, 2010. 122(12): pp. 1192-1199). The exact mechanism by which preeclampsia and other hypertensive disorders of pregnancy confer long-term cardiovascular risks is unknown. Maternal endothelial dysfunction has been found to persist for at least a year following delivery (Chen, C. W., I. Z. Jaffe, and S. A. Karumanchi, *Pre-eclampsia and cardiovascular disease. Cardiovasc Res*, 2014. 101(4): pp. 579-586).

Available treatment options of preeclampsia are symptomatic, by giving antihypertensive drugs, complemented with magnesium infusion in severe cases. The current clinical practice is to give a low dose of acetyl salicylic acid (ASA) as prophylaxis in high risk subjects. The most important treatment objective is to avoid pre-term deliveries.

Various LMWHs (Low Molecular Weight Heparins) such as dalteparin and enoxaparin have been investigated as a therapy in preeclampsia. However, due to safety concerns in relation to anticoagulant activity as well as inconsistent results regarding efficacy, they have to date not proven useful in clinical practice of preeclampsia therapy.

WO 2003/055499 describes the use of certain sulfated glycosaminoglycans for the prevention and treatment of slow progress of term labor. WO 2013/147689 describes the use of a chemically modified heparin or heparan sulfate in labor induction. WO 2013/147690 describes the use of a chemically modified heparin or heparan sulfate in labor arrest. WO 2013/169194 describes the use of a chemically modified heparin or heparan sulfate in the treatment of post partum hemorrhage (PPH). WO 2013/095279 describes a novel chemically modified glycosaminoglycan and is described as useful for the prevention and treatment of protracted labor (dystocia), protein leakage such as Gorham Stout syndrome, sepsis and protein-losing enteropathy. WO2014/202982 describes a novel manufacturing process for the preparation of a chemically modified glycosaminoglycan.

Preeclampsia (PE) is associated with a number of short- and long-term perinatal and neonatal complications, i.e. complications for the baby, including death. Short-term complications may be fetal growth restriction (FGR), oligohydramnios, intrauterine fetal death (IUFD), preterm birth, low Apgar score, non-assuring FHR during labor, or need for NICU admission. Long-term complications may be cerebral palsy, low IQ, hearing loss, visual impairment, insulin resistance, diabetes mellitus, coronary artery disease, or hypertension (Poon L. C. et al: *The International Federation of Gynecology and Obstetrics (FIGO) initiative on pre-eclampsia: A pragmatic guide for first-trimester screening and prevention; Int J Gynecol Obstet* 2019; 145(Suppl. 1): 1-33DOI: 10.1002/ijgo.12802).

A problem with using LMWHs in preeclampsia therapy is the dose limitation factor and safety concerns. A preeclampsia (PE) woman who needs to undergo acute caesarian section cannot be given a low molecular weight heparin due to the bleeding risk, and general anesthesia is yet a risk factor for these women.

There are currently no available therapeutic nor prophylactic drugs for preeclampsia (PE), and thereby for the short- and long-term consequences in PE. Consequently, there is a large medical need for new, safe and effective prophylactic and therapeutic (interventional) treatment options for preeclampsia.

DESCRIPTION OF THE INVENTION

An object of the present invention is to find a novel therapy for preeclampsia (PE). More particularly an object of the invention is the use of the heparin derivative tafoxiparin for prophylactic as well as therapeutic (interventional) treatment of preeclampsia (PE).

An aspect of the present invention is the heparin derivative tafoxiparin
(i) having an antifactor IIa activity of less than 10 IU/mg;
(ii) having an antifactor Xa activity of less than 10 IU/mg;
(iii) having a weight average molecular weight (Mw) from 4.6 to 6.9 kDa; and
(iv) having a predominantly occurring saccharide of (Formula I):

Formula (I)

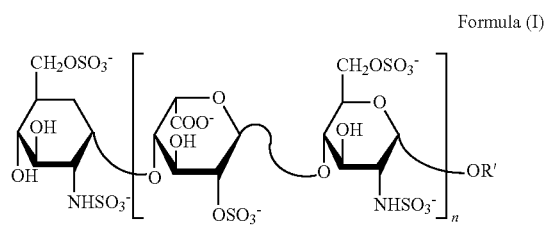

wherein

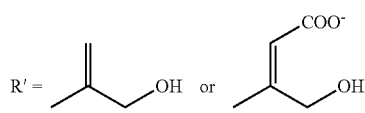

n is an integer from 2 to 20, so that the polysaccharide chains have from 2 to 20 disaccharide units corresponding to molecular weights between 1.2 and 12 kDa;
(v) wherein the polysaccharide chains are essentially free of chemically intact non-sulfated iduronic and/or glucuronic acids from the pentasaccharide sequences mediating the anticoagulant effect; and
(vi) wherein the chemically modified glycosaminoglycans have a distribution of polysaccharides and their corresponding molecular weight expressed as cumulative % of weight according to the table:

| Molecular mass [kDa] | Cumulative weight [%] |
|---|---|
| >10 | 4-15 |
| >8 | 10-25 |
| >6 | 22-45 |
| >3 | >70 | for use in the treatment of preeclampsia.

In one aspect of the invention, the predominantly occurring polysaccharide chains in the heparin derivative tafoxiparin as used in accordance with the present invention have between 6 and 12 disaccharide units with molecular weights from 3.6-7.2 kDa.

In an aspect of the invention, the heparin derivative tafoxiparin as described herein produces signals at 5.95 ppm and 6.15 ppm in a 1H-NMR spectrum.

In one aspect of the invention, the heparin derivative tafoxiparin as used in accordance with the invention comprises non-reducing end unsaturated glucosamines presented as signals in the interval of 5.0 to 6.5 ppm in a 1H-NMR spectrum with an intensity (% ratio) of less than 4% in relation to the signal at 5.42 ppm from native heparin.

One aspect of the invention is the heparin derivative tafoxiparin as herein described, for use in combination therapy with a standard of care therapy for preeclampsia (PE).

Examples of agents (drugs) that may be useful as standard of care agents (drugs) in combination therapy according to the present invention, are acetylsalicylic acid (ASA), anti-hypertensive agents, corticosteroids, or a magnesium agent such as magnesium sulfate.

Examples of anti-hypertensive agents that may be useful as standard of care agents (drugs) in combination therapy in accordance with the present invention are diuretics, calcium channel blockers, adrenergic receptor antagonists, renin inhibitors, or endothelium receptor blockers. Examples of diuretics that may be useful as anti-hypertensive agents in a combination therapy according to the present invention are loop diuretics such as bumetanide, ethacrynic acid, furosemide or torsemide; thiazide diuretics such as epitizide, hydrochlorothiazide, chlorothiazide, bendroflumethiazide, methyclothiazide or polythiazide; thiazide-like diuretics such as indapamide, chlorthalidone, metalozone, xipamide, or clopamide; potassium-sparing diuretics such as amiloride, triamterene, spironolactone, or eplerenone.

Examples of calcium channel blockers that may be useful as anti-hypertensive agents in a combination therapy according to the present invention are amlodipine, cilnidipine, clevidipine, felodipine, isradipine, lercanidipine, levamlodipine, nicardipine, nifedipine, nimodipine, nisoldipine, nitrendipine, diltiazem, or verapamil.

Examples of ACE inhibitors (angiotensin-converting enzyme inhibitors) that may be useful as an anti-hypertensive agent in a combination therapy according to the present invention are captopril, enalapril, fosinopril, lisinopril, moexipril, perindopril, quinapril, ramipril, trandolapril, and benazepril.

Examples of angiotensin II receptor antagonists that may be useful as anti-hypertensive agents in a combination therapy according to the present invention are azilsartan, candesartan, candesartan cilexetil, eprosartan, irbesartan, losartan, olmesartan, telmisartan, valsartan, or fimasartan. Examples of adrenergic receptor antagonists that may be useful as anti-hypertensive agents in a combination therapy according to the present invention are beta blockers such as acebutolol, atenolol, bisoprolol, betaxolol, carteolol, carvedilol, labetalol, metoprolol, nadolol, nebivolol, oxprenolol, penbutolol, pindolol, propranolol, or timolol; and alpha blockers such as doxazosin, phentolamine, indoramin, phenoxybenzamine, prazosin, terazosin, or tolazoline.

Yet further examples of agents that may be useful as anti-hypertensive agents in a combination therapy according to the present invention are renin inhibitors such as aliskiren, or endothelium receptor blockers such as bosentan.

One aspect of the present invention is the heparin derivative tafoxiparin for use in the treatment of preeclamspia (PE).

One aspect of the invention is the heparin derivative tafoxiparin for use as prophylactic treatment of preeclamspia (PE).

One aspect of the invention is the heparin derivative tafoxiparin for use in therapeutic (interventional) treatment of preeclampsia (PE).

An aspect of the invention is the heparin derivative tafoxiparin for use as monotherapy in the treatment of preeclampsia (PE).

An aspect of the invention is the heparin derivative tafoxiparin for use in combination with a standard of care (SOC) therapy for preeclampsia (PE).

One aspect of the present invention is the heparin derivative tafoxiparin for use as described herein, wherein said tafoxiparin is administered as add-on therapy to a subject who is already receiving a standard of care therapy for preeclampsia (PE).

An aspect of the invention is the heparin derivative tafoxiparin for use as described herein, wherein said tafoxiparin is administered prior to administering a standard of care therapy for preeclampsia (PE).

An aspect of the invention is the heparin derivative tafoxiparin for use as described herein, wherein said tafoxiparin is administered simultaneously with administering a standard of care therapy for preeclampsia (PE).

In an aspect of the invention, a preeclampsia (PE) therapy as described herein is initiated to a pregnant woman at risk of developing preeclampsia (PE).

In an aspect of the invention, a preeclampsia (PE) therapy as described herein is initiated at the time when a pregnant woman is diagnosed as having preeclampsia.

In an aspect of the invention, a preeclampsia (PE) therapy as described herein is initiated at positive pregnancy test in a woman.

In an aspect of the invention, a preeclampsia (PE) therapy as described herein is initiated on a woman who has been diagnosed as suffering from HELLP syndrome.

In an aspect of the invention, a preeclampsia (PE) therapy as described herein is initiated on a woman who has been diagnosed as suffering from eclampsia.

In an aspect of the invention, a preeclampsia (PE) therapy as described herein is initiated on a woman who is obese.

In an aspect of the invention, a preeclampsia (PE) therapy as described herein is initiated on a woman who has been diagnosed as being pre-diabetic.

In an aspect of the invention, a preeclampsia (PE) therapy as described herein is initiated on a woman who has been diagnosed as being diabetic.

In one aspect of the invention, a preeclampsia (PE) therapy as described herein is terminated at delivery.

An aspect of the present invention is post-partum therapy of preeclampsia (PE) (therapy after delivery of the baby). Such therapy may be initiated at any time after delivery with a duration of such therapy for up to one week, up to two weeks, up to three weeks, up to four weeks, up to five weeks, up to six weeks, up to seven weeks, up to eight weeks, up to nine weeks, up to ten weeks, or with a duration of such post-partum therapy of preeclampsia (PE) as determined by the responsible physician of said woman.

An aspect of the invention is the heparin derivative tafoxiparin for use to improve placental circulation exchange with maternal (spiral arteries) circulation in a woman diagnosed with preeclampsia (PE), or in a woman who is at risk of developing preeclampsia (PE).

An aspect of the invention is a method for the treatment of preeclampsia (PE), whereby a therapeutically effective amount of the heparin derivative tafoxiparin:
  (i) having an antifactor IIa activity of less than 10 IU/mg;
  (ii) having an antifactor Xa activity of less than 10 IU/mg;
  (iii) having a weight average molecular weight (Mw) from 4.6 to 6.9 kDa; and
  (iv) having a predominantly occurring saccharide of (Formula I):

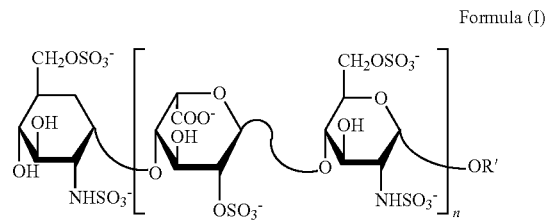

Formula (I)

wherein

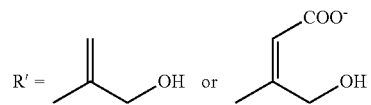

n is an integer from 2 to 20, so that the polysaccharide chains have from 2 to 20 disaccharide units corresponding to molecular weights between 1.2 and 12 kDa;

(v) wherein the polysaccharide chains are essentially free of chemically intact non-sulfated iduronic and/or glucuronic acids from the pentasaccharide sequences mediating the anticoagulant effect; and (vi) wherein the chemically modified glycosaminoglycans have a distribution of polysaccharides and their corresponding molecular weight expressed as cumulative % of weight according to the table:

| Molecular mass [kDa] | Cumulative weight [%] |
|---|---|
| >10 | 4-15 |
| >8 | 10-25 |
| >6 | 22-45 |
| >3 | >70 | is administered to a woman in need of such treatment.

An aspect of the invention is the use of the heparin derivative tafoxiparin:
  (i) having an antifactor IIa activity of less than 10 IU/mg;
  (ii) having an antifactor Xa activity of less than 10 IU/mg;
  (iii) having a weight average molecular weight (Mw) from 4.6 to 6.9 kDa; and
  (iv) having a predominantly occurring saccharide of (Formula I):

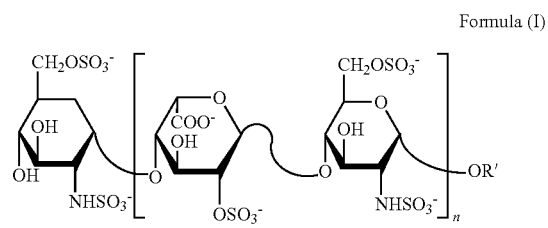

Formula (I)

wherein

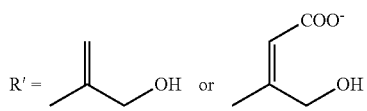

n is an integer from 2 to 20, so that the polysaccharide chains have from 2 to 20 disaccharide units corresponding to molecular weights between 1.2 and 12 kDa;

(v) wherein the polysaccharide chains are essentially free of chemically intact non-sulfated iduronic and/or glucuronic acids from the pentasaccharide sequences mediating the anticoagulant effect; and (vi) wherein the chemically modified glycosaminoglycans have a distribution of polysaccharides and their corresponding molecular weight expressed as cumulative % of weight according to the table:

| Molecular mass [kDa] | Cumulative weight [%] |
|---|---|
| >10 | 4-15 |
| >8 | 10-25 |
| >6 | 22-45 |
| >3 | >70 | for the manufacture of a medicament for the treatment of preeclampsia (PE).

According to the present invention, tafoxiparin may be used as monotherapy, or in combination therapy with an agent used as standard of care therapy (SOC) for preeclampsia.

DEFINITIONS

Figure 1A:
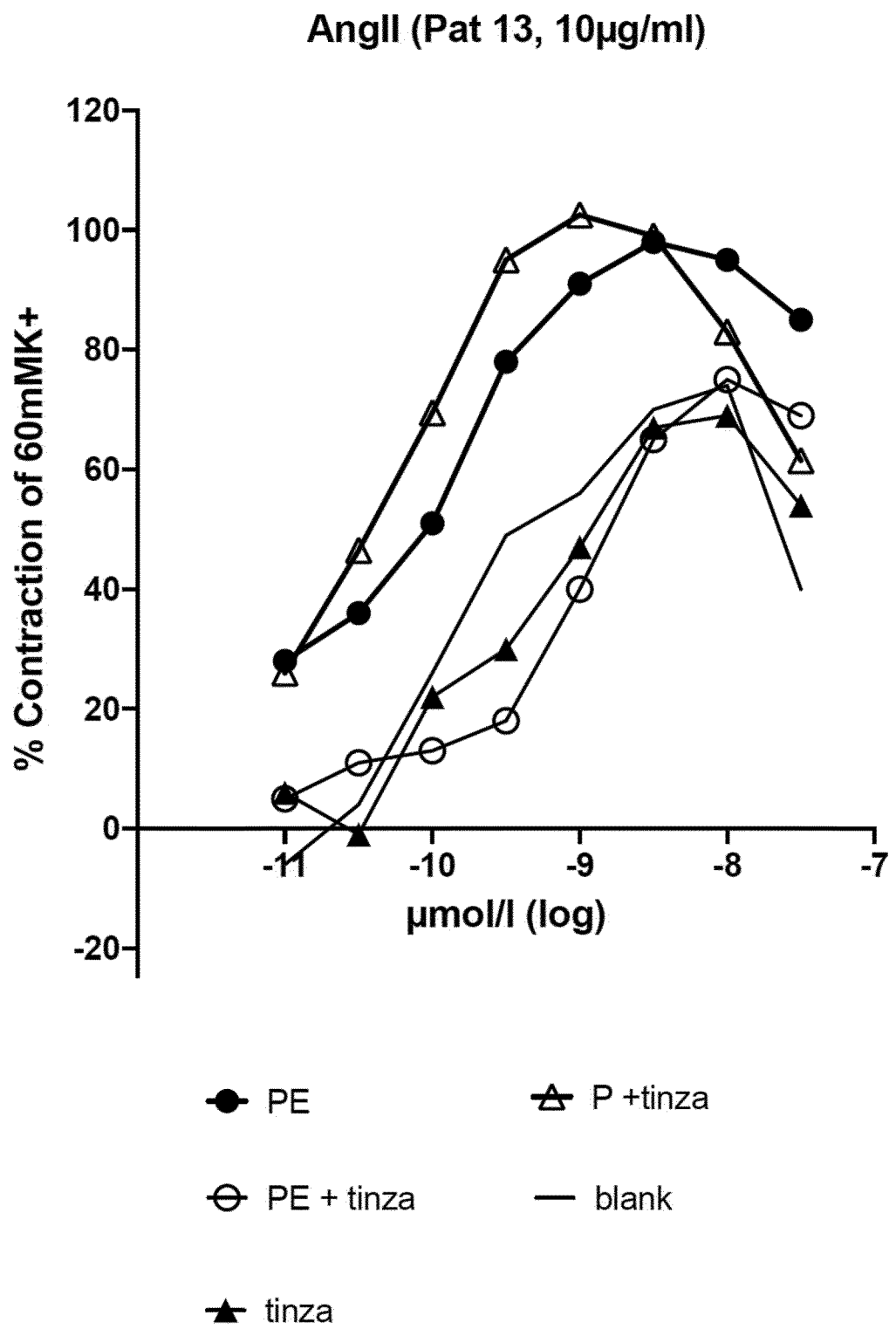
FIG. 1A (Example 1) shows concentration-contraction graphs for one patient (patient no. 13) in the presence of increasing concentrations of angiotensin II. The X-axis reflects the concentration of the vasoconstrictor angiotensin II, and the Y-axis reflects the contractile response.

Tafoxiparin is a heparin derivative with the company compound code DF01. The INN (International Nonproprietary Name) for DF01 is tafoxiparin sodium. The CAS registry number (CAS RN) for tafoxiparin is RN 1638190-65-4. DF01 is a depolymerized form of heparin with essentially no anticoagulant activity.

More specifically, tafoxiparin is a heparin derivative:
(i) having an antifactor IIa activity of less than 10 IU/mg;
(ii) having an antifactor Xa activity of less than 10 IU/mg;
(iii) having a weight average molecular weight (Mw) from 4.6 to 6.9 kDa, such as 5.0-6.9 kDa; and
(iv) having a predominantly occurring saccharide of (Formula I):

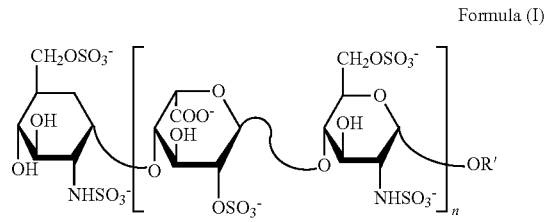

Formula (I)

wherein

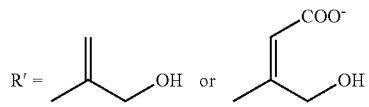

n is an integer from 2 to 20, so that the polysaccharide chains have from 2 to 20 disaccharide units corresponding to molecular weights between 1.2 and 12 kDa;

(v) wherein the polysaccharide chains are essentially free of chemically intact non-sulfated iduronic and/or glucuronic acids from the pentasaccharide sequences mediating the anticoagulant effect; and (vi) wherein the chemically modified glycosaminoglycans have a distribution of polysaccharides and their corresponding molecular weight expressed as cumulative % of weight according to the table:

| Molecular mass [kDa] | Cumulative weight [%] |
|---|---|
| >10 | 4-15 |
| >8 | 10-25 |
| >6 | 22-45 |
| >3 | >70 |

The predominantly occurring polysaccharide chains of tafoxiparin have between 6 and 12 disaccharide units with molecular weights from 3.6-7.2 kDa.

Tafoxiparin may have non-reducing end unsaturated glucosamines presented as signals in the interval of 5.0 to 6.5 ppm in a 1H-NMR spectrum with an intensity (% ratio) of less than 4% in relation to the signal at 5.42 ppm from native heparin, and may also be producing signals at 5.95 ppm and 6.15 ppm in an $^1$H-NMR spectrum.

The heparin derivative tafoxiparin may comprise glycol-split residues according to the chemical structure:

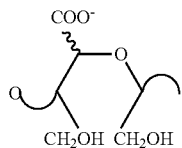

The wording "treatment or therapy" as used herein takes the normal wording within the medical and pharmaceutical field, and includes therapeutic treatment as well as prophylactic treatment.

Whenever the wording "therapeutic treatment" or "interventional therapy" is used herein, it means treatment of a pregnant woman who is diagnosed or has been diagnosed as having (suffering from) preeclampsia (PE). This treatment (therapy) may be monotherapy with tafoxiparin, or combination therapy comprising the administration of tafoxiparin and an agent (drug) used as standard of care therapy for preeclampsia (PE).

Whenever the wording "prophylactic therapy", "prophylactic treatment" or "preventive treatment" is used herein, it means that tafoxiparin is administered to a pregnant woman who is at risk of developing preeclampsia (PE) but who has not yet been diagnosed as having (suffering from) preeclampsia (PE). This prophylactic therapy (preventive therapy) may be monotherapy with tafoxiparin, or combination therapy comprising tafoxiparin and an agent (drug) used as standard of care (SOC) therapy for preeclampsia (PE).

The wording "monotherapy" as used herein means therapy with tafoxiparin alone, administered to a woman who is diagnosed or has been diagnosed with preeclampsia (PE), or a woman who is at risk of developing preeclampsia (PE). Monotherapy may be therapeutic therapy (treatment) or preventive therapy (prevention).

The wording "combination therapy" as used herein means therapy with tafoxiparin in combination with an agent (drug) used as standard of care therapy for preeclampsia (PE). Combination therapy may be used by administering said combination therapy to a woman who is diagnosed or has been diagnosed with preeclampsia (PE), or a woman who is at risk of developing preeclampsia (PE). Combination therapy may be therapeutic therapy (treatment) or preventive therapy (prevention). Tafoxiparin may in combination therapy according to the present invention, be administered prior to, after (add-on) or simultaneously to the administration of an agent (drug) used as standard of care therapy for preeclampsia (PE).

The wording "tafoxiparin (used) as add-on therapy" as used herein is defined as combination therapy wherein tafoxiparin is administered to a pregnant woman who is already receiving standard of care therapy for preeclampsia (PE). The add-on therapy may be therapeutic (i.e. treatment) or preventive (i.e. prophylactic).

The wording "tafoxiparin administered prior to the administration of an agent (drug) used as standard of care therapy for preeclampsia (PE)" is defined as combination therapy wherein tafoxiparin is administered prior to administering an agent (drug) used as standard of care therapy in preeclampsia (PE).

The wording "add-on therapy" as used herein, encompasses that tafoxiparin may be administered prior to administering an agent (drug) used as standard of care therapy, or alternatively tafoxiparin may be administered after having administered an agent (drug) used as standard of care therapy for preeclampsia (PE).

The wording "simultaneous administration" as used herein means that tafoxiparin and an agent (drug) used as standard of care therapy for preeclampsia (PE) are administered simultaneously to a woman in need of preeclampsia therapy.

When acetylsalicylic acid (ASA) is used as standard of care therapy, it may in one aspect of the invention be used in a woman who has been diagnosed with preeclampsia (PE) in a previous pregnancy. In an aspect of the invention, acetylsalicylic acid (ASA) may be used as standard of care therapy in a woman who is diagnosed, or has been diagnosed, as having preeclampsia (PE) in an ongoing pregnancy. In an aspect of the invention, acetylsalicylic acid (ASA) may be used as standard of care therapy in a woman who is being at risk of developing preeclampsia (PE).

The wording "standard of care therapy" (SOC) as used herein is defined as treatment or therapy that is recommended by national and international societies, guidelines in the field and medicinal and regulatory authorities for use in a pregnant woman at risk of developing preeclampsia (PE) or a pregnant woman who has been diagnosed as suffering from preeclampsia (PE). Standard of care therapy may be useful in a woman who has been diagnosed with preeclampsia (PE) in a previous pregnancy, or in a pregnant woman who is being or has been diagnosed as having preeclampsia (PE) in an ongoing pregnancy, or in a pregnant woman who is being at risk of developing preeclampsia (PE).

The wording "pregnant woman" means a pregnant woman who has not previously been pregnant or has not previously given birth, or a pregnant woman who has previously been pregnant and who has previously given birth.

The wording "standard of care drug", "standard of care agent" and "standard of care medication" may be used interchangeably, but have the same meaning.

Examples of standard of care therapy medications commonly used in preeclampsia therapy are acetylsalicylic acid (ASA), anti-hypertensive agents, corticosteroids and anti-convulsant medications.

Corticosteroids may in one aspect of the invention be used as an agent in a standard of care therapy, when the baby is at risk of being born preterm with poor lung function due to the mother having suffered from preeclampsia during pregnancy (PE). Examples of corticosteroids that may be useful are dexamethasone or prednisolone. Using corticosteroids in a woman having preeclampsia is referred to as antenatal therapy.

Acetylsalicylic acid (ASA) is a commercially available analgesic drug which is recognised as the trademark Aspirin® in countries such as the EU and the US (IUPAC name 2-acetyloxybenzoic acid).

The wording "preeclampsia (PE)" is defined as a condition in a pregnant woman, where the woman has a blood pressure (BP) of 140/90 or higher, such as 160/100 or higher, and an albumine/creatinine value in urine of ≥30 mg/mmol. Proteinuria (≥2+ on urine dip-stick) may be a further indicator of preeclampsia (PE). Preeclampsia is herein defined according to Poon L. C. et al: *The International Federation* of Gynecology and Obstetrics (FIGO) initiative on pre-eclampsia: A pragmatic guide for first-trimester screening and prevention; Int J Gynecol Obstet 2019; 145 (Suppl. 1): 1-33DOI: 10.1002/ijgo.12802. The definition of preeclampsia as made herein, should however not disqualify the meaning of the term "preeclampsia" in case this condition would at a later time be re-defined by medical experts in the field.

Preeclampsia (PE) is a pregnancy-specific vascular disease characterized by de novo maternal hypertension and organ damage, and more specifically pregnancy-induced hypertension with proteinuria (i.e. a high amount of protein in the urine) that typically develops after 20 weeks of gestation. A reduction in uterine blood flow causes placental ischemia and placental release of anti-angiogenic factors such as sFlt-1 followed by PE. Pre-eclampsia increases the risk of poor outcomes for both the mother and the baby. In severe disease there may be red blood cell breakdown; a low blood platelet count; impaired liver function; kidney dysfunction; swelling; shortness of breath due to fluid in the lungs; and/or visual disturbances. If left untreated, it may result in seizures at which point it is known as eclampsia. Risk factors for pre-eclampsia include earlier diagnose of pre-eclampsia, obesity, prior hypertension, older age, and diabetes mellitus. Preeclampsia is more frequent in a woman's first pregnancy and if she is carrying twins. The underlying mechanism involves abnormal formation of blood vessels in the placenta amongst other factors. Most cases are diagnosed before delivery. Rarely, pre-eclampsia may begin in the period after delivery.

The definition of preeclampsia (PE) is also associated with a number of short- and long-term perinatal and neonatal complications, i.e. complications for the baby, including death. Short-term complications may be fetal growth restriction (FGR), oligohydramnios, intrauterine fetal death (IUFD), preterm birth, low Apgar score, nonassuring FHR during labor, or need for NICU (Neonatal Intensive Care Unit) admission. Long-term complications may be cerebral palsy, low IQ, hearing loss, visual impairment, insulin resistance, diabetes mellitus, coronary artery disease, or hypertension (Poon L. C. et al: *The International Federation of Gynecology and Obstetrics (FIGO) initiative on pre-eclampsia: A pragmatic guide for first-trimester screening and prevention; Int J Gynecol Obstet* 2019; 145 (Suppl. 1): 1-33DOI: 10.1002/ijgo.12802).

The acute maternal manifestations resolve after the delivery of the baby but often leaves the women with permanent vascular damage. Preeclampsia is associated with increased risk for future chronic hypertension, cardiovascular disease (CVD), cerebrovascular disease, and death.

While historically both high blood pressure (>140/90 in a woman after 20 weeks of pregnancy) and protein in the urine were required to make the diagnosis, some definitions also include those with hypertension and any associated organ dysfunction. The exact mechanism by which preeclampsia and other anti-hypertensive disorders of pregnancy confer long-term cardiovascular risks is unknown.

The wording "HELLP syndrome" is a life-threatening pregnancy complication considered to be a variant of preeclampsia. It usually occurs during the later stages of pregnancy, or sometimes after childbirth. H stands for hemolysis, which is the breaking down of red blood cells; EL stands for elevated liver enzymes; and LP stands for low platelet count. HELLP syndrome can be difficult to diagnose, especially when high blood pressure and protein in the urine are not present. Its symptoms are sometimes mistaken for gastritis, flu, acute hepatitis, gall bladder disease, or other conditions.

The wording "obese" is defined as a person (in the present invention woman) who has a BMI (Body Mass Index) of 30 or higher (definition according to US National Institutes of Health (the NIH).

The wording "pre-diabetic" means a person (in the present invention a woman) having a component of the metabolic syndrome, and is characterized by elevated blood sugar levels that fall below the threshold to diagnose diabetes mellitus. It usually does not cause symptoms but people with prediabetes often have obesity (especially abdominal or visceral obesity), dyslipidemia with high triglycerides and/or low HDL cholesterol, and hypertension. It is also associated with increased risk for cardiovascular disease (CVD). Prediabetes is more accurately considered an early stage of diabetes as health complications associated with type 2 diabetes often occur before the diagnosis of diabetes (*American Diabetes Association (January* 2017). *Classification and diagnosis of diabetes". Diabetes Care*. 40 (Suppl 1): S11-S24. doi:10.2337/dc17-S005. PMID 27979889).

The wording "diabetes" or "diabetic" means a group of metabolic disorders characterized by a high blood sugar level over a prolonged period of time (*World Health Organization*. Archived from the original on 31 Mar. 2014. Retrieved 4 Apr. 2014). Symptoms often include frequent urination, increased thirst, and increased hunger. If left untreated, diabetes can cause many complications (*WHO*. October 2013. Archived from the original on 26 Aug. 2013. Retrieved 25 Mar. 2014). Acute complications can include diabetic ketoacidosis, hyperosmolar hyperglycemic state, or death. Serious long-term complications include cardiovascular disease, stroke, chronic kidney disease, foot ulcers, damage to the nerves, and damage to the eyes.

The wording "post-partum therapy" (therapy initiated after delivery) is herein defined as treatment (prophylactic treatment or therapeutic treatment) of a woman who has delivered a baby, and where said woman is at risk of developing a cardiovascular disease or any other disease that may be due to preeclampsia or eclampsia, or a woman who has already been diagnosed with a cardiovascular disease or any other disease that may be due to preeclampsia or eclampsia. Such therapy may be initiated at any time after delivery with a duration of such therapy for up to one week, up to two weeks, up to three weeks, up to four weeks, up to five weeks, up to six weeks, up to seven weeks, up to eight weeks, up to nine weeks, up to ten weeks, or with a duration of such post-partum therapy of preeclampsia (PE) as determined by the responsible physician of said woman.

Treatment of preeclampsia (PE) as herein described, may in a further aspect of the invention continue after delivery of the baby, where the duration of such therapy may be continued up to one week, up to two weeks, up to three weeks, up to four weeks, up to five weeks, up to six weeks, up to seven weeks, up to eight weeks, up to nine weeks, up to ten weeks, or up to a suitable time as determined by the responsible physician of said woman.

The wording "increase placental circulation exchange with maternal (spiral arteries) circulation" as used herein, means maintaining or improving the ability of the umbilical vein to carry fresh oxygenated and nutrient-rich blood circulating back to the fetal systemic circulation.

The wording preeclampsia, pre-eclampsia or PE is used interchangeably throughout the present specification and claims, but has the same meaning.

Pharmaceutical Formulations and Administration Routes

The heparin derivative tafoxiparin as used in accordance with the present invention may be administered as a pharmaceutical composition suitable for systemic administration. An example of systemic administration is parenteral administration, such as by subcutaneous administration, intravenous injection, infusion or intramuscular administration.

Tafoxiparin as used in accordance with the present invention may also be administered by local administration. Examples of local administration that may be useful in administering the tafoxiparin in accordance with the invention are oral administration, vaginal administration or rectal administration.

For parenteral administration, tafoxiparin may be incorporated into a solution or suspension, which may also contain one or more adjuvants such as sterile diluents such as water for injection, saline, fixed oils, polyethylene glycol, glycerol, propylene glycol or other synthetic solvents, antibacterial agents, antioxidants, chelating agents, buffers and agents for adjusting the osmolality. The parenteral pharmaceutical formulation may be filled into ampoules, vials, disposable syringes or as infusion arrangements, such as for self-administration.

In one aspect of the invention, the dose of tafoxiparin as used in accordance with the present invention may be selected from any one of the daily doses 300-2000 mg per day; 400-2000 mg/day; 500-2000 mg/day; 600-2000 mg/day; 700-2000 mg/day; 800-2000 mg/day; 900-2000 mg/day; 1000-2000 mg/day; 1100-2000 mg/day; 1200-2000 mg/day; 1300-2000 mg/day; 1400-2000 mg/day; 1500-2000 mg/day; 1600-2000 mg/day; 1700-2000 mg/day; 1800-2000 mg/day; and 1900-2000 mg/day.

In one aspect of the invention, the dose of tafoxiparin as used in accordance with the present invention may be selected from any one of the daily doses 350-2000 mg per day; 450-2000 mg/day; 550-2000 mg/day; 650-2000 mg/day; 750-2000 mg/day; 850-2000 mg/day; 950-2000 mg/day; 1050-2000 mg/day; 1150-2000 mg/day; 1250-2000 mg/day; 1350-2000 mg/day; 1450-2000 mg/day; 1550-2000 mg/day; 1650-2000 mg/day; 1750-2000 mg/day; 1850-2000 mg/day; and 1950-2000 mg/day.

In an aspect of the invention, the dose of tafoxiparin as used in accordance with the present invention may be selected from any one of the daily doses 300-1000 mg per day; 400-1000 mg/day; 500-1000 mg/day; 600-1000 mg/day; 700-1000 mg/day; 800-1000 mg/day; and 900-1000 mg/day.

In an aspect of the invention, the dose of tafoxiparin as used in accordance with the present invention may be selected from any one of the daily doses 350-1000 mg per day; 450-1000 mg/day; 550-1000 mg/day; 650-1000 mg/day; 750-1000 mg/day; 850-1000 mg/day; and 950-1000 mg/day.

In one aspect of the invention, the dose of tafoxiparin as used in accordance with the present invention is from 50-300 mg/per day, such as from 60-300 mg/day, 70-300 mg/day, 80-300 mg/day, 90-300 mg/day, 100-300 mg/day, 110-300 mg/day, 120-300 mg/day, 130-300 mg/day, 140-300 mg/day, 150-300 mg/day, 160-300 mg/day, 170-300 mg/day, 180-300 mg/day, 190-300 mg/day, 200-300 mg/day, 210-300 mg/day, 220-300 mg/day, 230-300 mg/day, 240-300 mg/day, 250-300 mg/day, 260-300 mg/day, 270-300 mg/day, 280-300 mg/day, or 290-300 mg/day.

In an aspect of the invention, the dose of tafoxiparin as used in accordance with the present invention is 50-100 mg/day such as 50 mg/day, 60 mg/day, 70 mg/day, 70 mg/day, 80 mg/day, 90 mg/day, or 100 mg/day. In an aspect of the invention, the dose of tafoxiparin as used in accordance with the present invention is 300 mg/day, 200 mg/day, or 150 mg/day.

In an aspect of the invention, the dose of tafoxiparin as used in accordance with the present invention is up to 150 mg/day, such as up to 100 mg/day, or up to 75 mg/day.

In one aspect of the invention, the administration may be once daily. In an aspect of the invention, the administration may be twice daily. In an aspect of the invention, the administration may be three times per day. For example, a daily dose of 300 mg may be divided by administering the tafoxiparin as three 100 mg doses, or two 150 mg doses. A daily dose of 150 mg may be divided as two 75 mg doses, or three 50 mg doses. A daily dose of 100 mg may be divided as two 50 mg doses.

EXAMPLES

Manufacture of Tafoxiparin

Tafoxiparin, as used in accordance with the present invention, may be prepared by following the synthetic procedure as described in Examples 1 to 9 of the published patent application WO 2013/095279 or Examples 1 to 3 of WO 2014/202982.

In the myograph experiments performed below, tafoxiparin was provided by Dilafor AB, Sweden, as a 150 mg/ml solution:

| Ingredient | Concentration | Function |
| --- | --- | --- |
| Tafoxiparin (DF01) | 150 mg/ml | API |
| Sodium phosphate | 15 mM | pH buffer |
| Hydrochloric acid | As required | Ph adjuster |
| Sodium hydroxide | As required | Ph adjuster |
| Water for injection | Ad 1 ml | Solvent/Diluent |

Biological Studies

During the pregnancy associated syndrome preeclampsia (PE), there is an increased release of placental syncytiotrophoblast extracellular vesicles (STBEVs) and free foetal haemoglobin (HbF) into the maternal circulation. Internalization of STBEVs into primary human coronary artery endothelial cells (HCAEC), and transfer of placenta specific miRNAs from STBEVs into the endoplasmic reticulum and mitochondria of these recipient cells, has been investigated by Cronqvist T et al: *Scientific Reports* 7:4558; DOI: 10.1038/s41598-017-04468-0. The miRNA mediated effects on gene expression may contribute to the oxidative and endoplasmic reticulum stress described in PE, as well as endothelial reprogramming that may underly the increased risk of cardiovascular disease reported for women with PE later in life (Cronqvist T et al: Scientific Reports 7:4558; DOI:10.1038/s41598-017-04468-0).

Cha Han et al report in *Haematologica* 2020, Volume 105(6):pp. 1686-1694 that elevated levels of placenta-derived extracellular vesicles (pcEV) in the circulation have been consistently associated with preeclampsia. The authors report that they demonstrated that pcEV from injured placenta induced a preeclampsia-like condition in mice by inducing endothelial injury, vasoconstriction, and hypercoagulation. This pcEV-induced condition was prevented by enhancing EV clearance. The rates of pcEV production and clearance could therefore be used for the risk assessment of preeclampsia and become new therapeutic targets for preeclampsia.

By protecting the blood vessels from contraction during pregnancy and thereby reducing the blood pressure, an improved placental circulation is established resulting in a lower risk of Intra Uterine Growth Restriction (IUGR). With normalized blood pressure and fetal growth the number of preterm births may be reduced. The long-term maternal effect will be a prevention of the re-programming of the vascular endothelial cells and thereby prevention of blood vessel stiffness after preeclampsia (PE).

The purpose of this study was to examine if and how vesicles derived from women with pre-eclampsia may modify the contractile responses to angiotensin II (AngII) and endothelin-1 (ET-1) in subcutaneous arteries removed from women who just delivered their child with caesarian sectioning. We investigated if the drug tafoxiparin could modify the contractile responses.

Abbreviations

The following abbreviations have been used in the working examples and in the Figures.

"P" means an artery segment which has been exposed to vesicles from a pregnant woman without PE.

"PE" means an artery or artery segment which has been exposed to vesicles from a pregnant woman with PE.

"PE-tafoxi" means an artery or artery segment which has been treated with tafoxiparin, followed by treatment with vesicles from a pregnant woman with PE.

"PE+tinza(parin)" means an artery or artery segment which has been treated with tinzaparin, followed by treatment with vesicles from a pregnant woman with PE.

"P+tafoxi" means an artery or artery segment which has been treated with tafoxiparin, followed by treatment with vesicles from a pregnant woman without PE.

"P+tinza(parin)" means an artery or artery segment which has been treated with tinzaparin, followed by treatment with vesicles from a pregnant woman without PE.

"Tafoxi" means that an artery or artery segment has been treated with tafoxiparin only (i.e. no addition of vesicles).

"Blank" means that an artery or artery segment has not been subjected to any treatment.

Substance P is a potent vasodilator of 11 amino acid residues well known to the skilled person.

Myograph Experiments

Placental syncytiotrophoblasts (STB) release extracellular vesicles (STB-EVs) that communicate physiological and pathological placental signals to the maternal organs. The STB-EV release is increased in preeclampsia (PE) (*Sammar et al Placenta* 66 (2018) pp. 17-25).

In a myograph model, arteries from subcutaneous tissue of women undergoing Caesarian section were used. The contractile effect of arteries comprising vesicles derived from placentas from pre-eclamptic women was compared with the contractile effect of arteries comprising vesicles derived from placentas from non-preeclamptic women. The possible effect on contractility by pre-treatment with tafoxiparin before adding the vesicles was also investigated. The Low Molecular Weight Heparin (LMWH) tinzaparin (Innohep®, Leo Pharma Denmark) was used as a comparator.

The multi wire myograph system is designed to investigate the highly isometric active and passive responses for small vessels (Högestätt et al, *Acta Physiol* 1983, 117, pp. 49-61) and currently applied to subcutaneous abdominal vessels (Edvinsson et al, *Acta Physiol* 2014; 210:811-22; Edvinsson et al, *Microcirculation* 2016; 23:438-46).

In the myograph experiments performed herein, tafoxiparin (DF01) was provided by Dilafor AB, Sweden.

Placental Perfusion and Sample Collection

Dual ex-vivo perfusion of isolated human placental cotyledons from normal (n=5) and PE (n=5) pregnancies is performed as described in Southcombe, J., Tannetta, D., Redman, C. & Sargent, I. *The immunomodulatory role of syncytiotrophoblast microvesicles. PLOS One*6, e20245 (2011). Briefly, the perfusion experiment consists of one equilibration phase of 30 minutes, from which the maternal perfusate is discarded. After equilibration, the maternal circuit is closed and the placenta is perfused for 3 hours. Only perfusions with a foetal return rate of >80% are included. The perfusate is collected from the maternal side at the end of the 3 hours perfusion and used for isolation and analysis of STBEVs. The placental perfusion method is chosen for collecting normal and PE STBEVs in this study, due to the large vesicle yield that is available using this method.

Isolation of STBEVs (Vesicles)

The STBEV isolation is performed using sequential centrifugation steps. After perfusion, the maternal perfusate is centrifuged at 600×g or 1500×g to remove red blood cells, and the supernatant is frozen and stored at −80° C. until further analysis. The supernatant is centrifuged for 30 minutes at 3500×g and +4° C. to remove cellular debris. The 3500×g supernatant is further ultra-centrifuged for 3 hours at 110 000×g at +4° C., and the pelleted material used for further study and referred to as the STBEVs.

The STBEV size distributions are analysed using Nanoparticle Tracking Analysis (NTA). The NTA is performed using a NanoSight LM10 (Malvern Instruments, Malvern, UK) equipped with a 488 nm laser. Normal (n=5) and PE (n=5) STBEVs are analysed, diluted in 1×PBS. Measurements are performed in 90 seconds triplicates using manual gain, camera level set to 10 or 11 and detection threshold set to 3. The obtained files are analysed using the NTA 3.2.16 software (Malvern Instruments). The STBEV protein concentrations are determined using a NanoDrop Spectrophotometer ND-1000 (NanoDrop Technologies, Wilmington, USA), or using the Pierce™ BCA Protein Assay (Thermo Scientific, Rockford, USA). The STBEVs are re-suspended in 1×Phosphate Buffered Saline (PBS), and stored at −80° C.

The vesicles used are different from experiment to experiment and pooled at different ratios depending on protein concentration. There is however no "potency" measured for each pooled batch of vesicles.

The mean vesicle sizes for normal and PE STBEVs were 186±22 nm and 185±6 nm, respectively. No significant differences in size distribution were observed between normal and PE STBEVs. A comparison between the STBEV samples' vesicle concentrations, estimated with NTA, and the protein concentration, measured using NanoDrop analysis, showed a protein concentration for normal and PE STBEVs to be 2.97±1.17 mg/ml and 2.68±2.04 mg/mL, respectively.

According to NTA the vesicles concentration was $1.18 \times 10^{09} + 8.20 \times 10^{08}$ and $9.63 \times 10^{08} \pm 8.04 \times 10^{08}$ particles/mL, respectively. Vesicle/particle count correlated strongly with the protein concentration (r=0.91). (*Placental syncytiotrophoblast extracellular vesicles enter primary endothelial cells through clathrin-mediated endocytosis*. Cronqvist T, Erlandsson L, Tannetta D, Hansson S R. Placenta. 2020 October; 100:133-141. doi:10.1016/j.placenta.2020.07.006. Epub 2020 Jul. 11.PMID: 32980046).

Contraction Experiments

Vessel [Artery Segment] Preparation and Contraction Experiments

Subcutaneous arteries were removed from the subcutaneous fat of the abdomen during Caesarean section and immediately put in cold DMEM-medium. Arteries were dissected in cold Na-Krebs buffer at a pH of 7.3-7.4 and cut into ring segments with a length of 1-2 mm as previously shown. The sections were mounted on two 40 μm-diameter wires and connected to a device sensitive to vascular tension. The stretching force property of the arteries were recorded with Mulvany-Halpern myographs. The mounted arterial segments were immersed into temperature-controlled (+37° C.) tissue baths containing bicarbonate-based buffer solution gassed with carbogen to obtain a pH of 7.3-7.4. Each segment was stretched to 90% of the normal internal circumference, which is the size each segment would have in a transmural pressure of 100 mm Hg. The contractile capacity of each artery segment was checked by exposure to 60 mM KCl buffer solution twice or three times to study viability. After each the bath was washed and the tone returned to baseline. When stable, different molecules or receptor agonists are added to the baths in concentration-dependent manner to observe the vasomotor responses of the vessels.

In some experiments the endothelial function was tested by pre-contraction the vessels with 30 mM potassium buffer, giving a stable tone and endothelium function evaluated by exposure to substance P ($10^{-6}$ or $10^{-5}$ M).

Arteries used in each experiment originates from different women with different anamneses, age, and genetic background, which are factors that may affect the vascular endothelium and its responsiveness to drug such as angiotensin and endothelin, to vesicle exposure and to the LMWH tinzaparin and tafoxiparin respectively.

Variation in vessel ring segments taken from one individual is reported to have high variations in the basic control tests such as the contractile capacity measured by KCl treatment and the endothelial function measured at pre-concentration induced by 5-HT and the dilatation to carbachol treatment.

The artery segments were studied by exposure to angiotensin II or endothelin 1 in cumulative concentrations of the agonists. Previous studies have shown that this results in contractions that are blocked by respective antagonists showing that this occurs via angiotensin $AT_1$ and Endothelin $ET_A$ receptors, respectively. In some experiments, 30 minutes after adding vesicles to the tissue baths concentration-contraction curves were obtained by cumulative application of angiotensin II (angiotensin 1 and 2 receptor agonist, concentration range $10^{-12}$ to $10^{-6}$ M). After washing and the tension returning to base line, agonists are added. After washing and the tension returning to base line endothelin 1 was added (endothelin A and B receptor agonist, concentration range $10^{-11}$ to $10^{-7}$ M).

Pre-Treatment.

Vessels were pre-treated for 30 minutes with the compound tafoxiparin (Dilafor AB, Sweden) and tinzaparin (Innohep®, Leo Pharma Denmark) respectively, to a final concentration in the baths of 10 μg/ml and 100 μg/ml of tafoxiparin and tinzaparin respectively. After 30 minutes, non-preeclampsia vesicles as control (P) or pre-eclampsia (PE) vesicles were added at a concentration of 200 μg (protein concentration 40 μg/mL). For patient no 13, UP15 (internal code) was used as control vesicles and UP18 (internal code) as PE-vessels. For patient no 14, UP8 (internal code) was used as control vesicles and UP17 as PE-vesicles.

In Vitro Vasocontraction Experiments 30 minutes after adding vesicles to the tissue baths, concentration-contraction curves were obtained by cumulative application of angiotensin II (A9525 Sigma-Aldrich Angiotensin II human, powder CAS Number 4474-91-3 dissolved in sodium chloride to a concentration of $10^{-3}$ M) and used in the concentration range $10^{-12}$ to $10^{-6}$ M. After wash-out and the tension had returned to base line, ET-1 (ALX-155-001, Enzo Life Sciences) was added and recorded (endothelin A and B receptor agonist, concentration range $10^{-11}$ to $10^{-7}$ M).

Calculations

Threshold for the contractile response to the 60 mM potassium rich bicarbonate buffer (Krebs buffer) was 0.5 mN using the average of the 2 or 3 responses to potassium buffer to obtain a steady appreciation of the contractile capacity (normalization value, 100%). Data were excluded from data processing if they did not meet the threshold of the contractile response to potassium rich buffer.

Maximum contraction elicited by an agonist is represented by maximum contractility (Emax), and log EC50 represents the agonist concentration that produced half the maximum response.

The x axis of the concentration-contraction graphs is log transformed. The graphs of angiotensin II and endothelin 1 are presented. Endothelial function is calculated by setting the 30 nM contraction as 100% and the relaxation to substance P shows that the endothelium is functional (in the present case about 30% relaxation relative to the 30 mM induced contraction).

As shown below in the experimental results and figures, presence of PE vesicles results in stronger contraction than control vesicles/non-PE vesicles (P).

Example 1

Patient 13

In patient no. 13 the inner diameter of the arteries were 200-250 μm. The endothelial function was intact in most segments except one.

Addition of tinzaparin (Innohep®) 10 μg/ml before treating/incubating the arteries with PE-vesicles reduced the maximum contraction induced by angiotensin II application by 23%, but the contraction induced with ET-1 (the $E_{max}$) was the same but the log $EC_{50}$ was reduced by 35% (extrapolated). Tinzaparin did not appear to have any reducing effect on contraction in the presence of control vesicles.

"Control" in Table 1a and Table 1b below means non-preeclampsia vesicles (P).

TABLE 1a

| AngII | Endothelial function [%] | $E_{max}$ [%] | $logEC_{50}$ |
|---|---|---|---|
| P (Control** ) | 67 | 74 | 10.2 |
| Tinzaparin | 96 | 69 | — |
| PE + Tinzaparin | 119.95 | 75 | 9.4 |
| PE | 5 | 98 | 10.5 |
| P + Tinzaparin | 69.11 | 103 | 10.8 |

**Near threshold for potassium response

TABLE 1b

| ET-1 | Endothelial function [%] | $E_{max}$ [%] | $logEC_{50}$ |
|---|---|---|---|
| P (Control** ) | 67 | 247 | 9.0 |
| Tinzaparin | 96 | 144 | 8.5 |
| PE + Tinzaparin | 119.95 | 143 | 5.7 |
| PE | 5 | 128 | 8.8 |
| P + Tinzaparin | 69.11 | 166 | 8.8 |

**Near threshold for potassium response

Figure 1B:
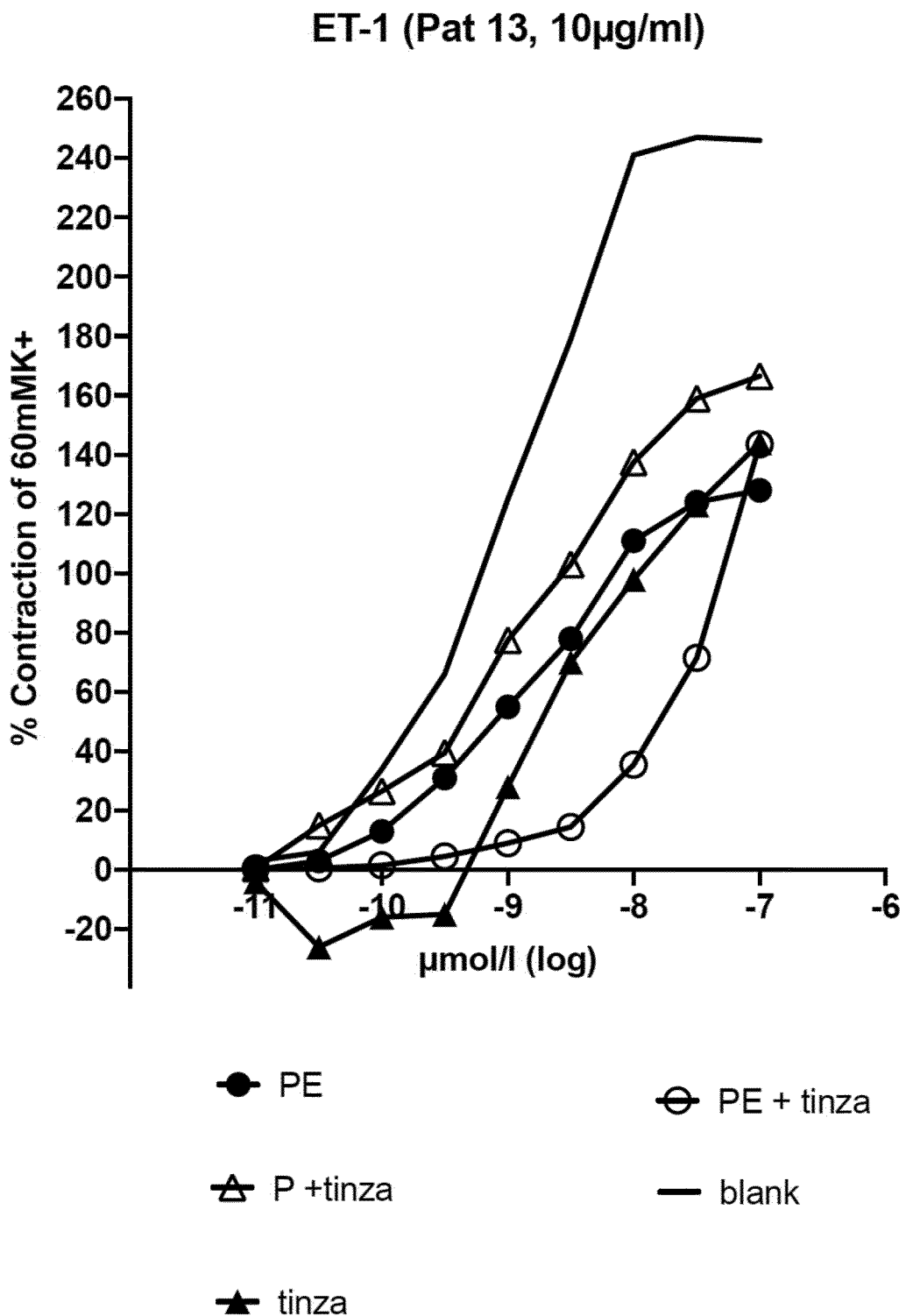
FIG. 1B (Example 1) shows concentration-contraction graphs for one patient (patient no. 13) in the presence of increasing concentrations of endothelin 1. The X-axis reflects the concentration of the vasoconstrictor endothelin 1, and the Y-axis reflects the contractile response.

The results are also illustrated in FIG. 1A and FIG. 1B, which show concentration-contraction graphs for patient no. 13, in the presence of angiotensin II (FIG. 1A) and endothelin 1 (FIG. 1B) with bottom line the agonist concentration. Left bar=contraction relative to that obtained with 60 mM potassium buffer. In the graphs "P" denotes non-preeclampsia vesicles; "tinza" denotes the LMWH tinzaparin; "PE" denotes preeclampsia vesicles; and "control" denotes no other agents that the agonist angiotensin II or endothelin 1 present in the tissue bath.

Example 2

Patient 14

In patient no. 14, the arteries were 150-350 μm in diameter and the endothelial function was intact in all except for two vessels (these were excluded).

Arteries from patient 14 were treated with both tinzaparin (comparative example) and tafoxiparin, respectively. Addition of tinzaparin at a concentration of 10 μg/ml before treating/incubating the vessels with PE-vesicles reduced the maximum contraction induced with angiotensin II by 14% and with ET-1 by 15%. Presence of tinzaparin with control vesicles increased contraction compared to only vesicles. In this case there was no control-vessel to compare with.

Addition of tafoxiparin at a concentration of 10 μg/ml reduced contraction induced with angiotensin II by 79% and with ET-1 by 56% in the presence of PE-vesicles. With control P vesicles, pre-treatment with tafoxiparin had little or no effect on the Ang II and ET-1 mediated contractions.

"P" in Table 2a and Table 2b below means non-preeclampsia vesicles.

TABLE 2a

| AngII | Endothelial function [%] | $E_{max}$ [%] | $logEC_{50}$ |
|---|---|---|---|
| PE | 1 | 127 | 10.4 |
| PE + Tinzaparin | 1 | 109 | 10.0 |
| P (Control) | 10 | 83 | 10.1 |
| P + Tinzaparin | 22 | 135 | 10.0 |
| Tafoxiparin | 85 | 101 | 10.2 |
| P + Tafoxiparin | 22 | 73 | 9.8 |
| PE + Tafoxiparin | 67 | 27 | 9.4 |

TABLE 2b

| ET-1 | Endothelial function [%] | $E_{max}$ [%] | $logEC_{50}$ |
|---|---|---|---|
| PE | 1 | 174 | 9.8 |
| PE + Tinzaparin | 1 | 147 | 9.9 |
| P (Control) | 10 | 98 | 7.0 |
| P + Tinzaparin | 22 | 197 | 9.4 |
| Tafoxiparin | 85 | 180 | 9.9 |
| P + Tafoxiparin | 22 | 105 | 7.7 |
| PE + Tafoxiparin | — | 77 | 6.9 |

Figure 2A:
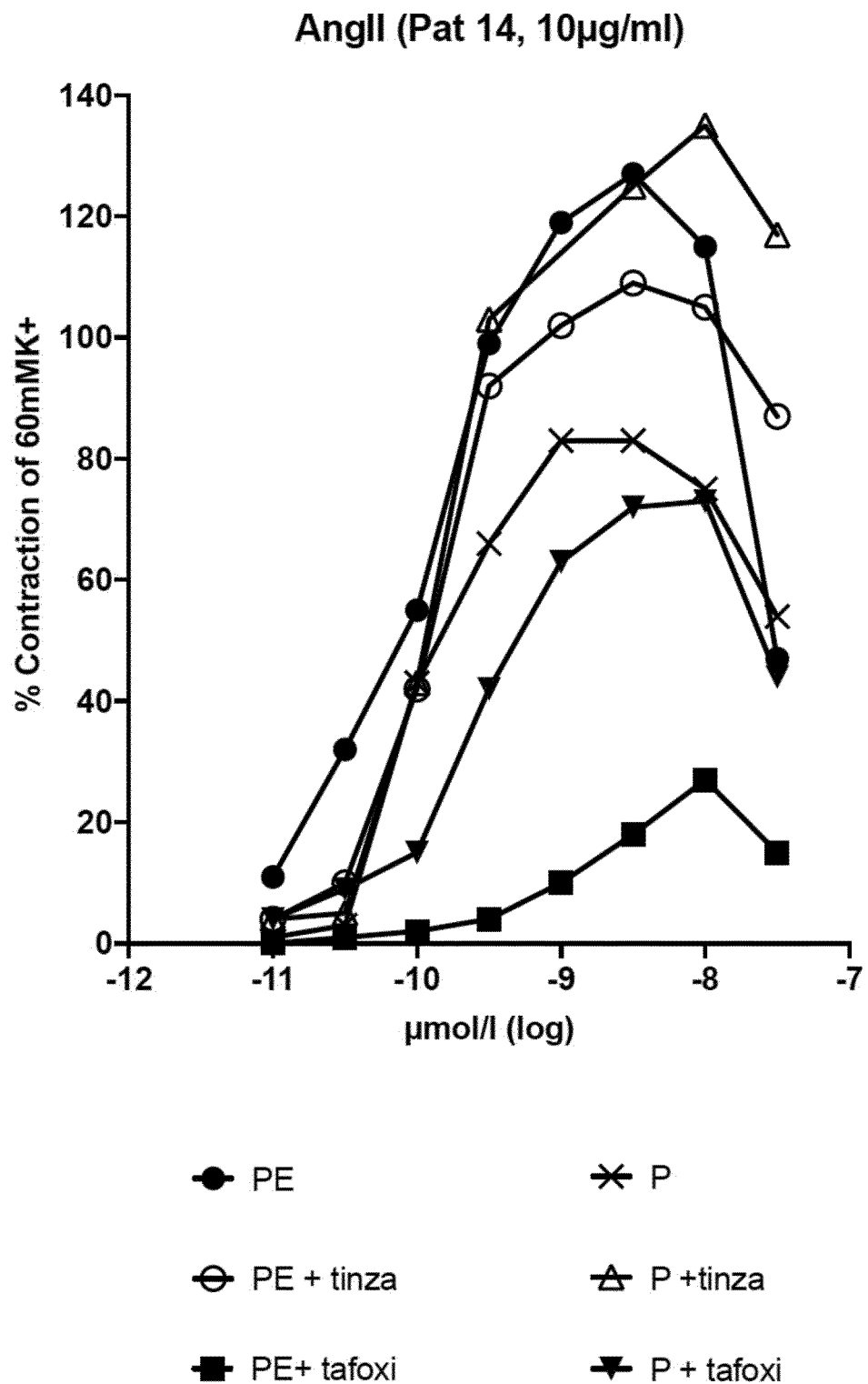
FIG. 2A (Example 2) shows concentration-contraction graphs for one patient (patient no. 14), elicited by addition of increasing concentrations of angiotensin II. The X-axis reflects the concentration of the vasoconstrictor angiotensin II, and the Y-axis reflects the contractile response.
Figure 2B:
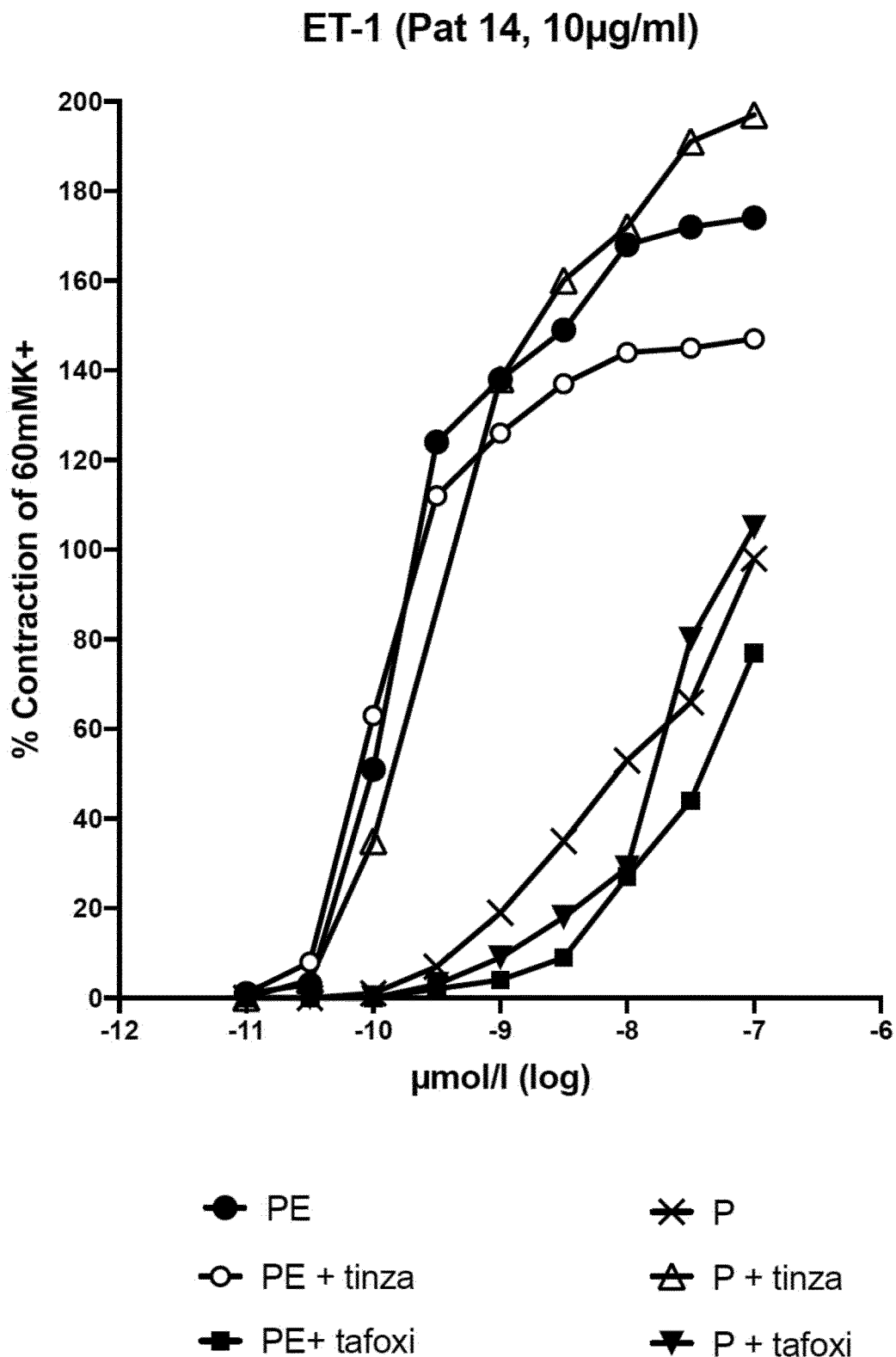
FIG. 2B (Example 2) shows concentration-contraction graphs for one patient (patient no. 14), elicited by addition of increasing concentrations of endothelin 1. The X-axis reflects the concentration of the vasoconstrictor endothelin 1, and the Y-axis reflects the contractile response.

The results are also illustrated in FIG. 2A and FIG. 2B, which show concentration-contraction graphs for patient no. 14 elicited by addition of increasing concentrations of angiotensin II (FIG. 2A) and endothelin 1 (FIG. 2B). The contractile responses are given as percent contraction relative to contraction induced by 60 mM potassium buffer (=100%). In the graphs "P" denotes non-preeclampsia vesicles; "tinza" denotes the LMWH tinzaparin; "PE" denotes preeclampsia vesicles; and "tafoxi" denotes tafoxiparin.

Example 3

In this experiment, Angiotensin II (Ang II) was used as vasoconstrictor. Data was pooled from four patients.

Contractile responses were induced by angiotensin II in vessel after pre-incubation with tafoxiparin at a concentration of 10 μg/ml, or with the comparator tinzaparin having a concentration of 10 μg/ml, followed by treatment with vesicles from PE placentas.

Presence of PE vesicles results in stronger contraction with cumulative concentrations of AngII compared to control vesicles (P). Pre-incubation with tafoxiparin affect the contractile effect of AngII in the presence of PE. Pre-incubation with tinzaparin (Innohep®) affect the contractile response of AngII in the presence of PE.

| Treatment | AUC | AUC/AUC (PE) % | % contractile change | p-value |
|---|---|---|---|---|
| PE | 234.4 | — | — | |
| Tafoxi + PE | 160.5 | 68.5 | −31.5 | 0.0039 |
| Tinza + PE (comparator) | 170.5 | 72.7 | −27.3 | 0.0039 |
| P (Control) | 182.1 | 77.7 | −22.3 | 0.30 |

The following statistical principal was used: Wilcoxon t-test. PE vs. PE + tafoxiparin = 0.0039; AUC −31.5%; PE vs. PE + Tinza = 0.0039; AUC −27.3%.

Figure 3:
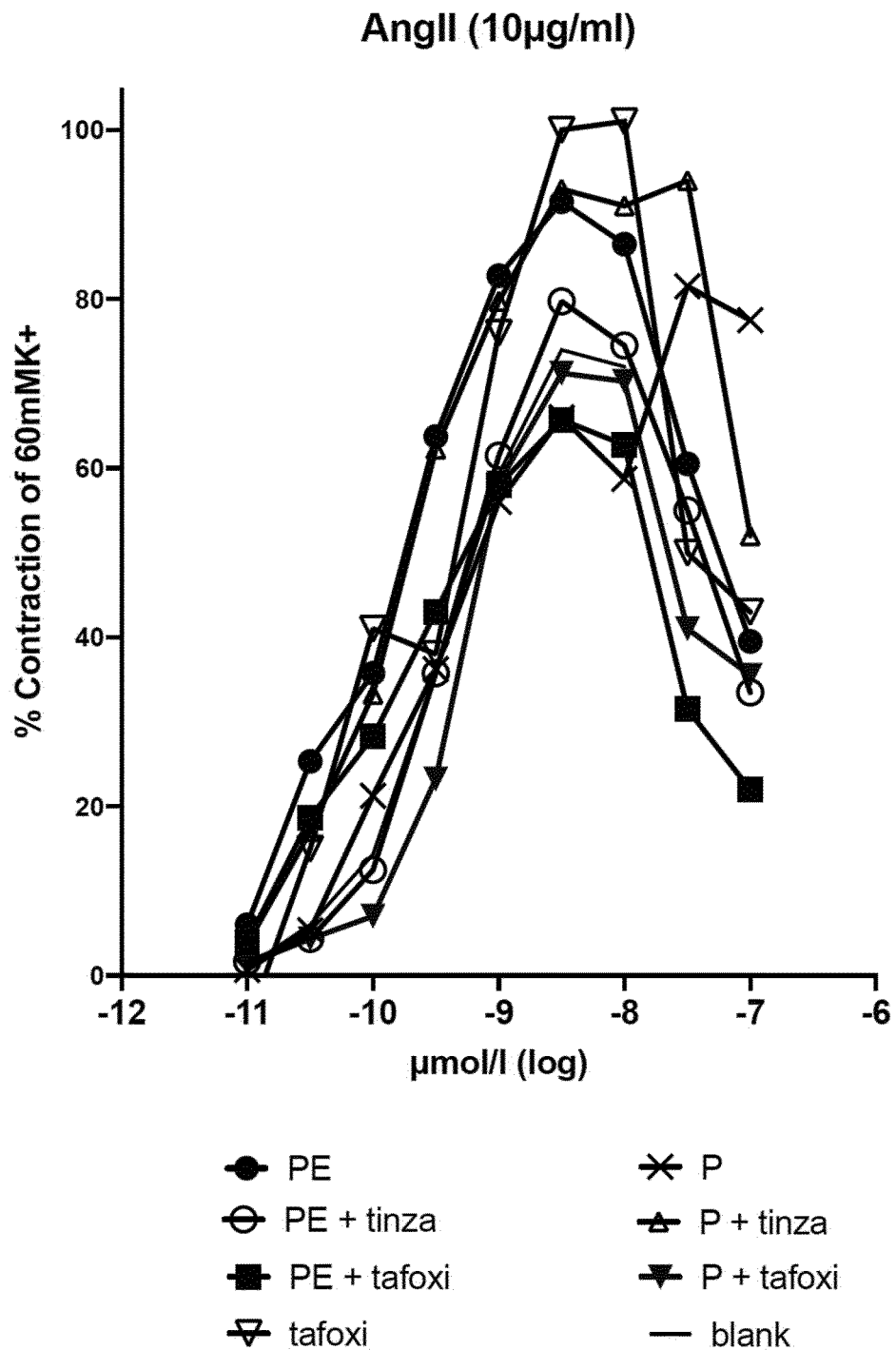
FIG. 3 (Example 3) shows contractile responses for tafoxiparin (10 μg/ml) and for the comparator LMWH tinzaparin (10 μg/ml), elicited by addition of increasing concentrations of Angiotensin II. The X-axis reflects the concentration of the vasoconstrictor angiotensin II, and the Y-axis reflects the contractile response.

The results are also illustrated in FIG. 3.

Example 4

In this experiment, Angiotensin II (Ang II) was used as vasoconstrictor. Data was pooled from five patients.

Contractile responses were induced by angiotensin II in vessel after pre-incubation with tafoxiparin having a concentration of 100 μg/ml, or with the comparator tinzaparin having a concentration of 100 μg/ml, followed by treatment with vesicles from PE placentas.

Presence of PE vesicles results in stronger contraction with cumulative concentrations of AngII compared to control vesicles (P). Pre-incubation with tafoxiparin significantly decreased the AngII induced contraction. Pre-incubation with the comparator tinzaparin (Innohep®) significantly decreased the AngII induced contraction.

| Treatment | AUC | AUC/AUC (PE) % | % contractile change | p-value |
|---|---|---|---|---|
| PE | 432.6 | — | — | |
| Tafoxi + PE | 306.5 | 70.8 | −29% | 0.027 |
| Tinza + PE (comparator) | 299.6 | 69.3 | −31% | 0.0273 |
| P (Control) | 327.7 | 75.8 | −24% | 0.0195 |

The following statistical principal was used: Wilcoxon t-test. PE vs. PE + tafoxiparin = **; p = 0.027; AUC −28%. PE vs. PE + Tinza = *; P = 0.0273; AUC −27%.

Figure 4:
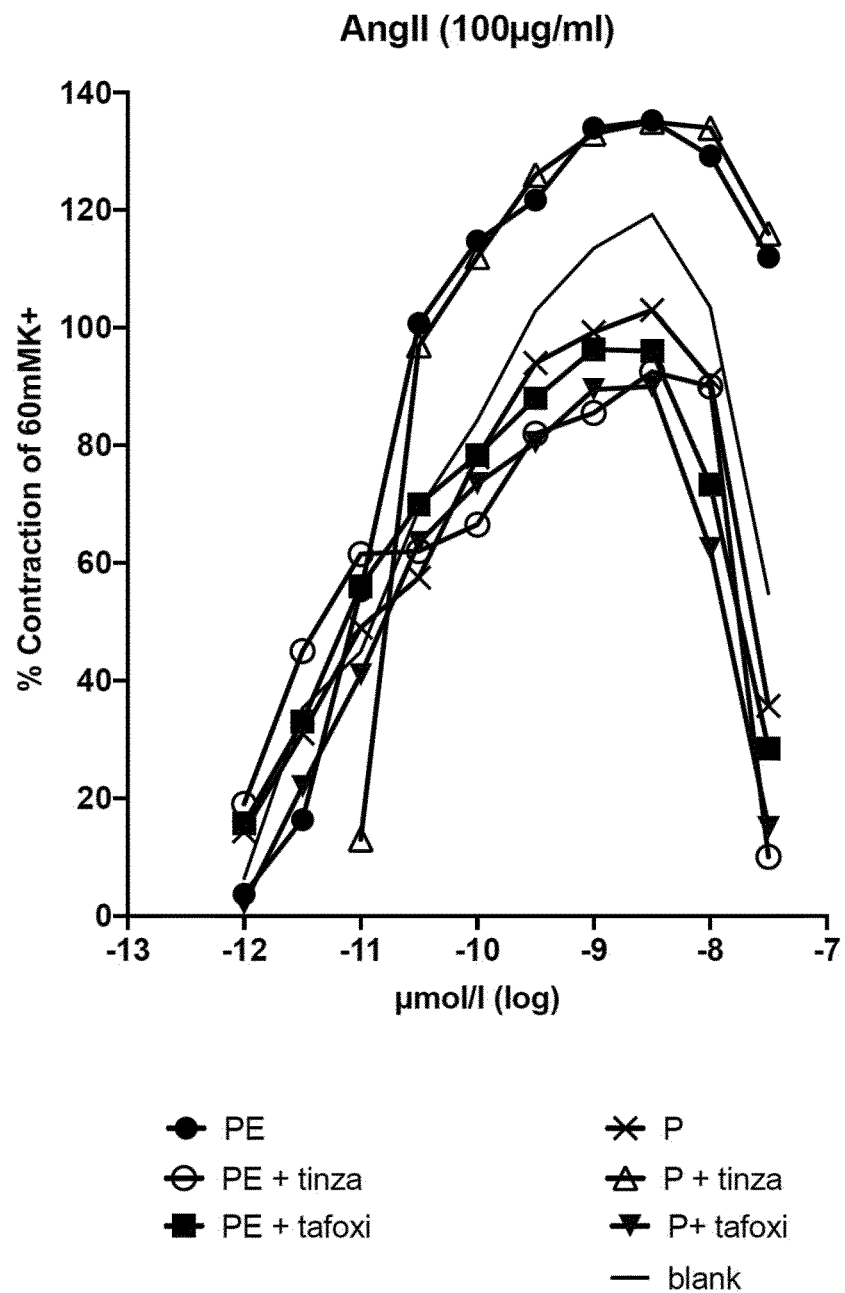
FIG. 4 (Example 4) shows contractile responses for tafoxiparin (100 μg/ml) and for the comparator LMWH tinzaparin (100 μg/ml), elicited by addition of increasing concentrations of Angiotensin II. The X-axis reflects the concentration of the vasoconstrictor angiotensin II, and the Y-axis reflects the contractile response.

The results are also illustrated in FIG. 4.

Example 5

In this experiment, Endothelin 1 (ET-1) was used as vasoconstrictor. Data was pooled from five patients.

Contractile responses were induced by increasing concentrations of ET-1 in arteries after pre-incubation with tafoxiparin at a concentration of 10 μg/ml, or with the comparator tinzaparin having a concentration of 10 μg/ml, followed by treatment with vesicles from PE placentas (PE).

In the presence of PE vesicles, ET-1 resulted in stronger contractile responses as compared to ET-1 responses in control vesicles (P). Pre-incubation with tafoxiparin, revealed a significantly lower contraction to ET-1. Pre-incubation with the comparator tinzaparin (Innohep®) revealed a significantly lower contraction to ET-1.

| Treatment | AUC | AUC/AUC (PE) % | % contractile change | p-value |
|---|---|---|---|---|
| PE | 312.3 | — | — | |
| Tafoxi + PE | 193.1 | 61.8 | −38% | 0.0039 |
| Tinza + PE (comparator) | 259.5 | 83.1 | −17% | 0.0039 |
| P (Control) | 236.4 | 75.7 | −24% | 0.0039 |

The following statistical principal was used: Wilcoxon t-test. PE vs. PE + tafoxiparin = *; p = 0.0039; AUC −38%; PE vs. PE + Tinza = *; p = 0.0039; AUC −17%.

Figure 5:
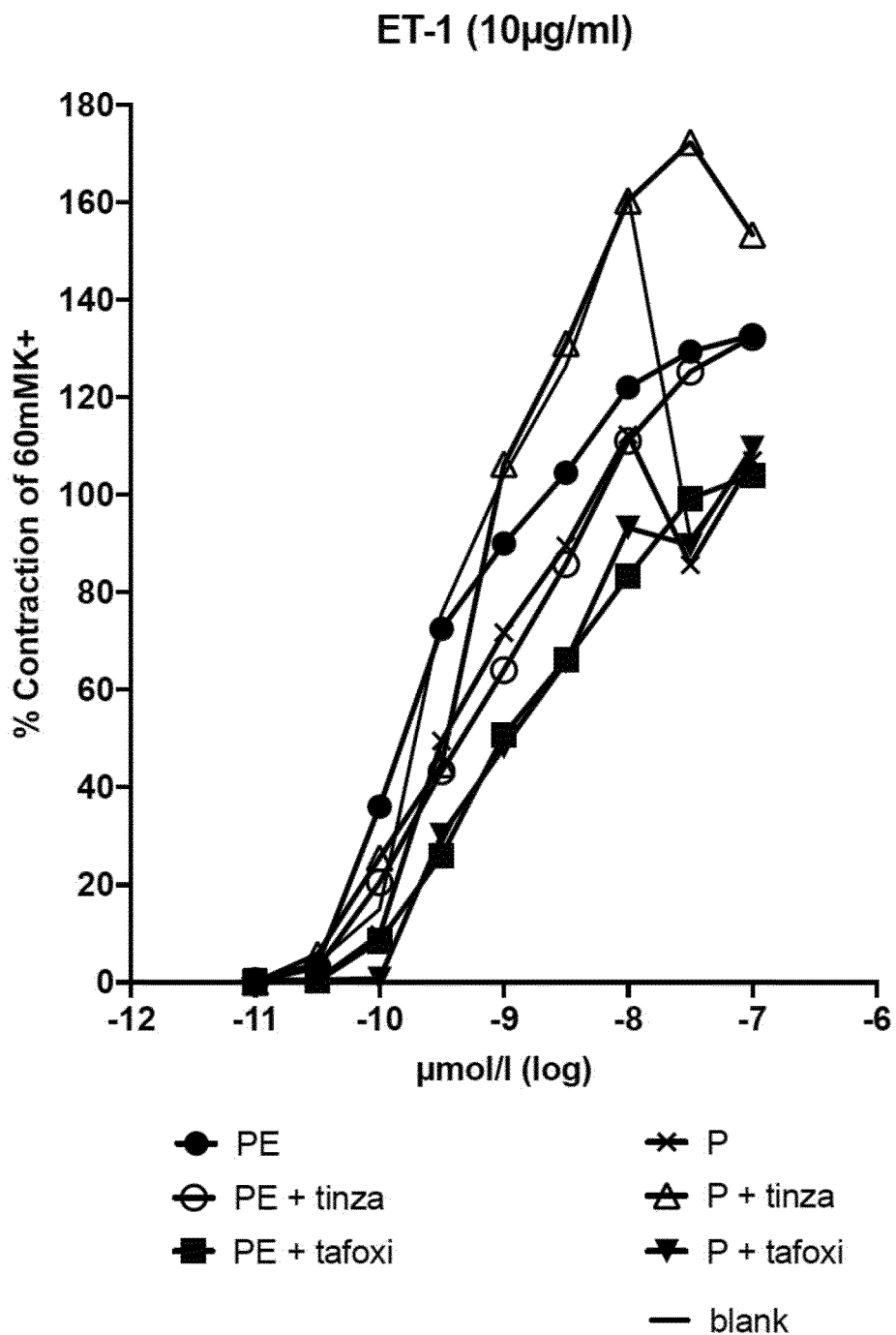
FIG. 5 (Example 5) shows contractile responses for tafoxiparin (10 μg/ml) and for the comparator LMWH tinzaparin (10 μg/ml), elicited by addition of increasing concentrations of Endothelin 1 (ET-1). The X-axis reflects the concentration of the vasoconstrictor Endothelin 1 (ET-1)., and the Y-axis reflects the contractile response.

The results are also illustrated in FIG. 5.

Example 6

Clinical Phase IIa Trial

An exploratory open label Phase IIa clinical pilot study will be performed. Pregnant women ≥18 years of age who have been diagnosed with pre-eclampsia between the 26$^{th}$ and 32$^{nd}$ week of gestation will be subjected to daily subcutaneous tafoxiparin therapy from the time of diagnosis and up to delivery.

A total of 23 subjects will participate in the study, with 15 subjects receiving active tafoxiparin treatment comprising Standard of Care (SOC) plus tafoxiparin, and 8 subjects receiving control which comprises Standard of Care therapy only. The duration of the study will be treatment from the time of diagnosis and up to 28 days. The treatment may alternatively be extended until delivery (i.e. treatment will last from the time of diagnosis and up to delivery). After delivery, there will be a follow-up period for 8 weeks.

Primary Objectives with this Study

Safety and tolerability will be evaluated through the frequency and character of adverse events and serious adverse events, complete and symptom-directed physical evaluations, vital signs, safety blood samples (hematology and clinical chemistry) and rate of withdrawals from the study and/or from the study medication.

Secondary Objectives with this Study

To assess the efficacy of tafoxiparin treatment on pre-eclampsia. For the purposes of this study, pre-eclampsia will be defined as Hypertension 160/100 with proteinuria (≥2+ on urine dip-stick or measured as albumin/creatinine ≥30 mg/mmol).

The following secondary (efficacy) endpoints will be monitored and evaluated:

Change in diastolic blood pressure from baseline to end of treatment and at 8 weeks follow-up control; Change in Aortic Pulse Wave Velocity (PWV) measured by carotid-femoral PWV (cfPWV) at baseline, after 2, 7 and 28 days of treatment, and at 8 weeks follow-up control; Change in cardiac output; Change in soluble Fms-like tyrosine kinase 1 (sFlt-1); Change in Placental Growth Factor (PIGF); Change in sFlt-1/PIGF ratio; Days of maintained pregnancy; Extent of anti-hypertensive treatment (number of drugs and doses); Fetal growth changes estimated by ultrasound; Change in umbilical cord blood flow; Change in uterine artery blood flow; Proportion of subjects with abruptio placenta; Proportion of infants with birth weight ≤5th percentile; Proportion of infants with birthweight in 6th-10th percentile; Proportion of subjects with fetal loss after 28 weeks of gestation; Proportion of subjects with eclampsia; Proportion of subjects with oliguria; Proportion of subjects submitted to intensive care units (ICU) during the study; Proportion of subjects undergoing preterm delivery; Proportion of subjects undergoing Caesarean sections (CS); Maternal and fetal Indications for CS; Proportion of subjects undergoing instrumental deliveries (vacuum extraction (VE)/forceps delivery); Proportion of subjects with Postpartum Hemorrhage (PPH)>2000 ml; Fetal outcome measured as Birth weight, Apgar score, Acidosis (pH<7.10) and/or Base Excess <−12 mmol/L arterial or venous in umbilical cord blood; and indication for referral to neonatal intensive care unit (NICU).

Study Drug

Tafoxiparin will be provided by Dilafor AB, Sweden, as a 150 mg/ml solution.

The investigational product will be administered subcutaneously every 24+3 hours by the site staff. The daily study treatment will be 300 mg (2×1 mL, 150 mg/ml of tafoxiparin) of tafoxiparin given subcutaneously (SC) for 4 weeks unless there is a clinical indication for treatment discontinuation or continuation. All subjects will be given standard treatment for pre-eclampsia including ASA 150 mg oral dose (OD) and anti-hypertensive treatment according to clinical practice.

Any medication (including over-the-counter or prescription medicines, and/or herbal supplements) or other specific categories of interest that the participant is receiving at the time of enrollment or receives during the study will be recorded.

The Following Medications are Prohibited Prior to and During the Study:

Use of drugs that interfere with hemostasis, including heparin/LMWH, non-steroidal anti-inflammatory drugs (NSAID), warfarin and vitamin K antagonists, for three weeks prior to enrollment (Baseline) and during the study. Use of acetylsalicylic acid (ASA) from early pregnancy or more than one week before entering the study are may not be used.

Biomarkers which Will be Monitored During the Study:
  I. Change in soluble Fms-like tyrosine kinase 1 (sFlt-1). sFlt1 is elevated in pre-eclampsia.
  II. Change in Placental Growth Factor (PIGF). Placental growth factor (PIGF) is an increasingly important molecule in the prediction, diagnosis, and treatment of pre-eclampsia.
  III. Change in sFlt-1/PIGF ratio. The sFlt-1 to PIGF ratio is elevated in pregnant women before the onset of pre-eclampsia.

Selection Criteria (a) Inclusion

In order to participate in this study, the subjects must meet all of the following inclusion criteria: Nulliparous pregnant women between 18 and 45 years of age, who have been diagnosed with pre-eclampsia and where the subject is planned for hospitalization. Gestational age must be from week 26 and up to week 32 (inclusive), confirmed by ultrasound before week 21 of gestation. The pregnancy must also be singleton pregnancy.

(b) Exclusion

Subjects who suffer from and/or have been diagnosed with, any of the following diseases and/or symptoms, are excluded from the study: Subjects who are unable to understand the written and verbal instructions in local Language; presence of placenta previa; pathologic CTG at inclusion; diabetes; preclampsia; HELLP syndrome (hemolysis, elevated liver enzymes, and low platelets); previously known coagulation disorders (Leiden—heterozygote); current use of any drugs that interfere with hemostasis (including heparin/LMWH, oral anti-coagulant medication, non-steroidal anti-inflammatory drugs (NSAID) compounds and vitamin K antagonists); essential hypertension with ongoing therapy; HIV or Acute hepatitis with ongoing treatment; known history of allergy to standard heparin and/or LMWH heparin; history of heparin-induced thrombocytopenia (platelet count≤100.000); current drug or alcohol abuse which in the opinion of the Investigator should preclude participation in the study; not fit for participation in the study according to the opinion of the investigator due to a concurrent disease or severe organ affection; current participation in other interventional medicinal treatment studies; fear of needles which is believed by the Investigator to affect study medication compliance; severe pulmonary edema; Idiopathic thrombocytopenia; chronic kidney disease; chronic hepatic disorders; systemic lupus erythematosus; and/or antiphospholipid syndrome.

Methods & Procedures for the Tafoxiparin Treatment Group

I. During Screening

A subject who is between week 26 and week 32 (inclusive) of gestation, who has been diagnosed with pre-eclampsia, meet all inclusion criteria and with no exclusion criteria, physical examination including vital signs, medical history and has signed the "Informed Consent" form is eligible for the study. The subjects will undergo the following activities: Informed consent; Inclusion and exclusion criteria; physical examination including vital signs, height and weight; Medical history; Blood Pressure (BP) recording according to instruction; CTG recording; Blood sample for hematology and clinical chemistry.

II. At Baseline

Prior to treatment the subjects will undergo the following activities: Inclusion and exclusion criteria; Physical examination; Blood pressure measurement according to instruction; CTG recording; Fetal ultrasound and umbilical cord blood flow and maternal uterine artery blood flow; Blood samples for biomarkers for pre-eclampsia; and PWV recording. Thereafter the women will be randomized to study treatment and the first study treatment will be given.

III. During Treatment

The investigational product will be administered subcutaneously every 24+3 hours by the site staff. The daily study treatment will be 300 mg (2×1 mL) of tafoxiparin given subcutaneously (SC) for 4 weeks unless there is a clinical indication for treatment discontinuation, or continuation. All subjects will be given standard treatment for pre-eclampsia including ASA 150 mg OD and anti-hypertensive treatment according to clinical practice.

If the pre-eclampsia deteriorates during or after the end of 4 weeks of treatment, the subject will be managed according to clinical practice. If the pre-eclampsia improves during the four weeks of tafoxiparin treatment, the treatment may be continued outside the main protocol until delivery. If this occurs, it must be registered in the eCRF.

During the treatment period, the following will be performed and recorded: daily blood pressure measurement; CTG recording; fetal ultrasound, umbilical cord blood flow and maternal uterine artery blood flow on day 7, 14, 21 and 28; Blood samples for hematology and clinical chemistry at days 7, 14, 21 and 28 of treatment; Blood samples for biomarkers for pre-eclampsia will at days 2, 7, 14, 21 and 28 of treatment; PWV recordings after 2, 7, 14, and 28 days of treatment; Cardiac output after 2, 7, 14, 21 and 28 days of treatment; daily check of treatment compliance; antihypertensive treatment documentation at 2, 7, 14, 21 and 28 days of treatment; AE/SAE review; on day 5 after the 5th dose has been given, a blood sample for hematology including thrombocyte count, should be taken and analyzed and reviewed before the 6th dose is given; and Concomitant medication recording.

IV. After Delivery

The following activities will be performed at the hospital: Blood pressure measurement; Blood samples for hematology and clinical chemistry; Antihypertensive treatment documentation; Infant status documentation; AE/SAE review; and Concomitant medication.

V. At Discharge

The following activities will be performed at the hospital: Blood pressure measurement according to instruction; PWV measurement; Cardiac output recording; Infant status documentation; Anti-hypertensive treatment recording; AE/SAE review; and Concomitant medication.

VI. Follow-Up

A follow-up control will be performed at the hospital clinic 8 weeks (+1 week) after discharge where the following investigations will be performed: Blood pressure measurement; Blood samples for hematology and clinical chemistry; PWV measurement; Cardiac output; Infant status documentation; Anti-hypertensive treatment recording; AE/SAE review; and Concomitant medication.

The subjects in the control group will undergo the same procedures listed above as the subjects in the treatment group apart from treatment with tafoxiparin.

The invention claimed is:

1. A method for the treatment of preeclampsia (PE) comprising administering a therapeutically effective amount of tafoxiparin to a subject in need of such treatment.

2. The method according to claim 1, wherein the treatment is combination therapy with a standard of care therapy for preeclampsia (PE).

3. The method according to claim 2, wherein the standard of care therapy for preeclampsia (PE) is selected from the group consisting of: acetylsalicylic acid (ASA), an anti-hypertensive agent, a corticosteroid, a magnesium compound, and a combination thereof.

4. The method according to claim 3, wherein the standard of care therapy is an anti-hypertensive agent selected from the group consisting of: a diuretic, a calcium channel blocker, an ACE inhibitor, an adrenergic receptor antagonist, a renin inhibitor, an endothelium receptor blocker, and a combination thereof.

5. The method according to claim 3, wherein the standard of care therapy is an antihypertensive agent.

6. The method according to claim 1, wherein said tafoxiparin is administered prior to, or simultaneously with, administering a standard of care therapy for preeclampsia (PE).

7. The method according to claim 1, wherein said tafoxiparin is administered as add-on therapy to a subject who is already receiving a standard of care therapy for preeclampsia (PE).

8. The method according to claim 1, wherein said tafoxiparin is administered by parenteral administration or local administration.

9. The method according to claim 8, wherein the parental administration is intravenous administration, intramuscular administration or sub-cutaneous administration.

10. The method according to claim 8, wherein the local administration is oral administration, vaginal administration or rectal administration.

11. The method according to claim 1, wherein said treatment is initiated at diagnosis of PE.

12. The method according to claim 1, wherein said treatment is terminated at delivery.

13. The method according to claim 1, wherein said treatment is terminated at a time-point which is from four to eight weeks from delivery.

14. The method according to claim 1, wherein said treatment is initiated at a positive pregnancy test.

15. The method according to claim 1, wherein the subject in need of treatment is a woman suffering from HELLP syndrome.

16. The method according to claim 1, wherein the subject in need of treatment is a woman suffering from eclampsia.

17. The method according to claim 1, wherein the subject in need of treatment is a woman who is obese, pre-diabetic or diabetic.

18. The method according to claim 1, wherein the treatment is post-partum therapy of preeclampsia.

19. The method according to claim 1, wherein the treatment is up to delivery.

20. The method of claim 3, wherein the standard of care therapy is acetylsalicylic acid (ASA).

* * * * *